US011905497B2

(12) United States Patent
Chan et al.

(10) Patent No.: US 11,905,497 B2
(45) **Date of Patent: *Feb. 20, 2024**

(54) MULTIUSE, ENZYMATIC DETERGENT AND METHODS OF STABILIZING A USE SOLUTION

(71) Applicant: ECOLAB USA INC., Saint Paul, MN (US)

(72) Inventors: Wendy Chan, Saint Paul, MN (US); Jennifer Stokes, Saint Paul, MN (US); Lyndal Jensen, Saint Paul, MN (US); Carter M. Silvernail, Saint Paul, MN (US); Terrence P. Everson, Saint Paul, MN (US); Graig Legatt, Saint Paul, MN (US); Nathan Richard Ortmann, Saint Paul, MN (US); Devon Beau Hammel, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 19 days.

This patent is subject to a terminal disclaimer.

(21) Appl. No.: 17/301,253

(22) Filed: Mar. 30, 2021

(65) Prior Publication Data

US 2021/0292682 A1 Sep. 23, 2021

Related U.S. Application Data

(63) Continuation of application No. 16/001,085, filed on Jun. 6, 2018, now Pat. No. 10,995,303, which is a continuation of application No. 14/536,804, filed on Nov. 10, 2014, now Pat. No. 10,011,808.

(60) Provisional application No. 61/902,490, filed on Nov. 11, 2013.

(51) Int. Cl.

| | |
|---|---|
| ***C11D 3/386*** | (2006.01) |
| ***C11D 3/30*** | (2006.01) |
| ***C11D 3/32*** | (2006.01) |
| ***C11D 3/37*** | (2006.01) |
| ***C11D 3/384*** | (2006.01) |
| ***C11D 3/10*** | (2006.01) |
| ***C11D 3/22*** | (2006.01) |

(52) U.S. Cl.

CPC ............ *C11D 3/38609* (2013.01); *C11D 3/10* (2013.01); *C11D 3/222* (2013.01); *C11D 3/30* (2013.01); *C11D 3/32* (2013.01); *C11D 3/3719* (2013.01); *C11D 3/3723* (2013.01); *C11D 3/384* (2013.01)

(58) Field of Classification Search

CPC ....... C11D 3/38609; C11D 3/10; C11D 3/222; C11D 3/30; C11D 3/32; C11D 3/3719; C11D 3/3723; C11D 3/384; C11D 11/0011; C11D 7/02; C11D 7/12; C11D 7/22; C11D 7/32; C11D 7/03

See application file for complete search history.

(56) References Cited

U.S. PATENT DOCUMENTS

| | | | |
|---|---|---|---|
| 3,560,392 | A | 2/1971 | Eymery et al. |
| 3,798,181 | A | 3/1974 | Vazquez |
| 4,142,999 | A | 3/1979 | Bloching et al. |
| 4,169,817 | A | 10/1979 | Weber |
| 4,243,546 | A | 1/1981 | Shaer |
| 4,261,868 | A | 4/1981 | Hora et al. |
| 4,842,758 | A | 6/1989 | Crutzen |
| 4,842,767 | A | 6/1989 | Warschewski et al. |
| 4,919,845 | A | 4/1990 | Vogt |
| 4,949,845 | A | 8/1990 | Dixon |
| 5,073,292 | A | 12/1991 | Hessel et al. |
| 5,264,142 | A | 11/1993 | Hessel et al. |
| 5,356,800 | A | 10/1994 | Jaquess |
| 5,382,377 | A | 1/1995 | Raehse |
| 5,558,812 | A | 9/1996 | Hahn et al. |
| 5,855,625 | A | 1/1999 | Maurer et al. |
| 5,928,929 | A | 7/1999 | Outtrup et al. |
| 6,017,864 | A | 1/2000 | Brittain et al. |
| 6,083,898 | A | 7/2000 | Meixner et al. |
| 6,165,960 | A | 12/2000 | Amory |
| 6,191,092 | B1 | 2/2001 | Bragulla et al. |
| 6,248,706 | B1 | 6/2001 | Herrmann et al. |
| 6,331,512 | B1 | 12/2001 | Foote et al. |
| 6,777,530 | B1 | 8/2004 | Meixner et al. |
| 8,153,413 | B2 | 4/2012 | Lu et al. |
| 8,227,397 | B2 | 7/2012 | Herdt et al. |
| 8,691,743 | B2 | 4/2014 | Kellar et al. |
| 2009/0312221 | A1 | 12/2009 | Lant et al. |
| 2010/0022431 | A1 | 1/2010 | Lant et al. |

(Continued)

FOREIGN PATENT DOCUMENTS

| | | |
|---|---|---|
| CA | 2163757 C | 12/1994 |
| CA | 2326758 | 5/2001 |

(Continued)

OTHER PUBLICATIONS

Ghorbel et al., "Stability studies of protease from Bacillus cereus BG1", Enzyme and Microbial Technology, vol. 32, Issue 5, pp. 513-518, Apr. 2003.
Chu et al., "Production and degradation of alkaline protease in batch cultures of Bacillus subtilis ATCC 14416", Enzyme Microb. Technol., vol. 14, pp. 755-761, Sep. 1992.
Coons et al., "Performance in Detergents, Cleaning Agents and Personal Care Products", Surfactants in Consumer Products, Chapter 5, pp. 275-277, 1987.
Meesters, Gabrie M.H., "Agglomeration of Enzymes, Microorganisms and Flavours", Handbook of Powder Technology, vol. 11, Chapter 12, pp. 555-573, 2007.

(Continued)

*Primary Examiner* — Kade Ariani
(74) *Attorney, Agent, or Firm* — McKee, Voorhees & Sease, PLC

(57) ABSTRACT

Stabilized use solutions of low phosphorus, alkali metal carbonate detergents employing enzymes for cleaning compositions are disclosed. In particular, the present invention is a composition for, and method of, removing soils, preventing redeposition of protein soils and reducing foam, using stabilized enzyme cleaning compositions, namely use solutions of the same.

15 Claims, 5 Drawing Sheets

(56) References Cited

U.S. PATENT DOCUMENTS

| | | | |
|---|---|---|---|
| 2010/0190682 | A1 | 7/2010 | Lee et al. |
| 2010/0216683 | A1 | 8/2010 | Kessler et al. |
| 2011/0136720 | A1 | 6/2011 | O'Connell et al. |
| 2011/0180112 | A1 | 7/2011 | Silvernail et al. |
| 2011/0287994 | A1 | 11/2011 | Herdt et al. |
| 2012/0021965 | A1 | 1/2012 | Bastigkeit et al. |
| 2012/0046211 | A1 | 2/2012 | Peters et al. |
| 2012/0149625 | A1 | 6/2012 | Simonsen et al. |
| 2013/0143297 | A1 | 6/2013 | Siegert et al. |
| 2013/0172228 | A1 | 7/2013 | Bartelme et al. |

FOREIGN PATENT DOCUMENTS

| | | | |
|---|---|---|---|
| CA | 2752791 | A1 | 8/2010 |
| CN | 1283220 | C | 11/2006 |
| DE | 2038103 | A1 | 2/1972 |
| EP | 0770593 | A1 | 2/1997 |
| GB | 2274849 | A | 10/1994 |
| JP | 59104324 | A | 6/1984 |
| JP | 34790 | A | 1/1991 |
| JP | 34791 | A | 1/1991 |
| JP | 3191781 | | 8/1991 |
| JP | 2005306822 | A | 11/2005 |
| JP | 2007137973 | A | 6/2007 |
| JP | 2007302760 | A | 11/2007 |
| WO | 9203529 | A1 | 3/1992 |
| WO | 9206162 | A1 | 4/1992 |
| WO | 9429424 | A1 | 12/1994 |
| WO | 9429428 | A1 | 12/1994 |
| WO | 9500635 | A1 | 1/1995 |
| WO | 9924548 | A1 | 5/1999 |
| WO | 9927067 | A1 | 6/1999 |
| WO | 9933948 | A1 | 7/1999 |
| WO | 9937746 | A1 | 7/1999 |
| WO | 0129170 | A1 | 4/2001 |
| WO | 03080827 | A2 | 10/2003 |
| WO | 2007058333 | A1 | 5/2007 |
| WO | 2012025902 | A3 | 3/2012 |
| WO | 2013090559 | A1 | 6/2013 |

OTHER PUBLICATIONS

International Searching Authority, International Search Report and Written Opinion, issued in connection to International Application No. PCT/US2014/064740, 13 pages, dated Feb. 24, 2015.

Deeth, H.C et al., "Chemistry of Milk—Role of Constituents in Evaporation and Drying", Dairy Powders and Concentrated Products, pp. 1-27. 2009.

Nalin, Tatiéle, Nalin et al., "Determination of Amylose/Amylopectin Ratio of Starches", J Inherit Metab, vol. 38, pp. 985-986. Apr. 29, 2015.

Egli et al., "Microbial degradation of chelating agents used in detergents with special reference to nitrilotriacetic acid (NTA)", Biodegradation, vol. 1, pp. 121-132, 1990.

Johnvesly et al., "Process Biochemistry", vol. 37, pp. 139-144, 2001.

Olsen et al., "JSD", vol. 1, pp. 555-567, 1998.

Aehle et al., "Enzymes in Industry, Production and Applications", published Jan. 8, 2008, publisher: Wiley, Page count: 516; Editor: Wolfgang Aehle, pp. 165-167, Jan. 8, 2008.

MULTIUSE, ENZYMATIC DETERGENT AND METHODS OF STABILIZING A USE SOLUTION

CROSS-REFERENCE TO RELATED APPLICATIONS

This is a Continuation Application of U.S. Ser. No. 16/001,085 filed Jun. 6, 2018, which is a Continuation Application of U.S. Ser. No. 14/536,804 filed Nov. 10, 2014, now U.S. Pat. No. 10,011,808 issued Jul. 3, 2018, which claims priority under 35 U.S.C. § 119 to provisional application U.S. Ser. No. 61/902,490 filed Nov. 11, 2013, herein incorporated by reference in its entirety.

This application is related to U.S. patent application Ser. No. 14/536,845 entitled High Alkaline Warewash Detergent with Enhanced Scale Control and Soil Dispersion. The entire contents of this patent application are hereby expressly incorporated herein by reference including, without limitation, the specification, claims, and abstract, as well as any figures, tables, or drawings thereof.

FIELD OF THE INVENTION

The present invention relates generally to the field of cleaning compositions. In particular, the present invention is a multi-use composition for, and method of, removing/preventing redeposition of soils using stabilized cleaning compositions, namely use solutions of the same, wherein the cleaning compositions beneficially include enzymes. The use solutions according to the invention are preferably generated from solid compositions containing the enzymes and enzyme stabilizing agents, beneficially providing shelf-stability for the enzyme-containing solid compositions as distinct from limited shelf-stability liquid formulations employing enzymes.

BACKGROUND OF THE INVENTION

Detergency is defined as the ability to wet, emulsify, suspend, penetrate, and disperse soils. Conventional detergents used in the warewashing and laundering industries include alkaline detergents. Alkaline detergent formulations employing alkali metal carbonates and/or alkali metal hydroxides, intended for both institutional and consumer use, are known to provide effective detergency, particularly when used with phosphorus-containing compounds.

Phosphates are multifunctional components commonly used in detergents to reduce water hardness as well as increase detergency, anti-redeposition, and crystal modification. In particular, polyphosphates such as sodium tripolyphosphate and their salts are used in detergents because of their ability to prevent calcium carbonate precipitation and their ability to disperse and suspend soils. If calcium carbonate is allowed to precipitate, the crystals may attach to the surface being cleaned and cause undesirable effects. For example, calcium carbonate precipitation on the surface of ware can negatively impact the aesthetic appearance of the ware and give the ware an unclean look. In the laundering area, if calcium carbonate precipitates and attaches onto the surface of fabric, the crystals may leave the fabric feeling hard and rough to the touch. In addition to preventing the precipitation of calcium carbonate, the ability of sodium tripolyphosphate to disperse and suspend soils facilitates the detergency of the solution by preventing the soils from redepositing into the wash solution or wash water.

However, the use of phosphorous raw materials in detergents has become undesirable for a variety of reasons, including environmental reasons. Due to recent regulations, work has recently been directed to replacing phosphorus in detergents. There is therefore a need in the art for an environmentally friendly multifunctional component that can replace the properties of phosphorous-containing compounds such as phosphates, phosphonates, phosphites, and acrylic phosphinate polymers.

Enzymes have been employed in cleaning compositions since early in the $20^{th}$ century. It was not until the mid-1960's when enzymes were commercially available with both the pH stability and soil reactivity for detergent applications. Enzymes are known as effective chemicals for use with detergents and other cleaning agents to break down soils. Enzymes break down soils making them more soluble and enabling surfactants to remove them from a surface to provide enhanced cleaning of a substrate.

Enzymes can provide desirable activity for removal of, for example, protein-based, carbohydrate-based, or triglyceride-based stains from substrates. As a result, enzymes have been used for various cleaning applications in order to digest or degrade soils such as grease, oils (e.g., vegetable oils or animal fat), protein, carbohydrate, or the like. For example, enzymes may be added as a component of a composition for laundry, textiles, ware washing, cleaning-in-place, drains, floors, carpets, medical or dental instruments, meat cutting tools, hard surfaces, personal care, or the like. Although enzyme products have evolved from simple powders containing alkaline protease to more complex granular compositions containing multiple enzymes and still further to liquid compositions containing enzymes, there remains a need for alternative cleaning applications employing stabilized enzymes. Numerous mechanisms for improving stabilization of enzymes for storage in liquid compositions, namely in liquid detergent compositions have been employed, such as disclosed in U.S. Pat. No. 8,227,397, which is incorporated by reference in its entirety. However, there remains a need for improvement such that liquid use compositions retain detergency and cleaning performance when exposed to high temperatures, pH and/or extended periods of time under use conditions.

Accordingly, it is an objective of the invention to develop a solid stabilized detergent composition with a protease enzyme and stabilizing agent such that storage and/or transport of the compositions are not limited. Moreover, such solid compositions are thereafter suitable for generating stabilized use solutions able to retain suitable enzyme stability under elevated temperature and pH conditions of use.

It is a further objective of the invention to develop multi-use, stabilized use solutions of detergent compositions and enzymes to enhance enzyme stability under elevated temperature and pH conditions to provide improved detergency.

It is an objective of the invention to develop methods for use of stabilized enzymes and/or stabilized use solutions containing enzymes for improved detergency.

It is a further objective of the invention to develop methods for use of stabilized enzymes and/or stabilized use solutions to retain enzyme and use solution stability for at least about 20 minutes or greater at temperatures from about 65-80° C. or greater and under alkaline conditions at a pH between about 9 and about 11.5. Beneficially, such objectives overcome significant limitations of the state of the art of enzyme stability in detergent compositions, namely wherein unstabilized enzyme activity significantly decreases over time, including within short time periods of as little as 5-20 minutes.

In an aspect of the invention, the enzymatic activity is retained under elevated temperature and pH conditions by the stabilization of enzyme-containing detergent compositions and/or detergent use solutions.

A further object of the invention is to develop multi-use compositions and methods for employing the same, to improve protein removal and antiredeposition properties of low phosphorus detergents, in particular sodium carbonate based detergents.

These and other objects, advantages and features of the present invention will become apparent from the following specification taken in conjunction with the claims set forth herein.

BRIEF SUMMARY OF THE INVENTION

Methods for stabilizing use solutions for detergent warewashing and stabilizing enzymes in detergent and multi-use compositions, in particular high temperature detergent applications to prolong enzyme stability and cleaning performance, are provided according to the invention. An advantage of the invention is the prolonged stability of enzymes, namely protease enzymes, and prolonged stability of use solutions of cleaning compositions at high temperatures for various detergent applications in comparison to compositions and use solutions of compositions that do not include the stabilizing agents disclosed herein.

In an embodiment, the present invention includes detergent use solutions for removing soils, including protein soils, from a surface of a substrate and preventing redeposition of protein soils onto the surface of the substrate. The detergent use solutions beneficially reduce and/or prevent foaming in the cleaning application providing further benefits of use. The use solutions according to embodiments of the invention include an alkali metal carbonate alkalinity source, protease enzymes and a stabilizing agent, such as for example an amine such as a casein or gelatin (nitrogen-containing stabilizer) or a poly sugar (starch-based stabilizer).

In a further embodiment, the present invention includes methods of stabilizing multi-use detergent use solutions and employing the same for removing soils, including protein soils, from a surface of a substrate and preventing redeposition of protein soils onto the surface of the substrate. The methods include generating and introducing a stabilized, enzyme-containing detergent use solution during a washing step of a wash cycle, washing the surface of the substrate with the use solution during the wash cycle, and subsequently rinsing the surface of the substrate (with or without a rinse aid). The generating of the use solution and wash cycle according to the invention for cleaning a substrate is suitable for use at high temperatures and pH over extended periods of time, including for example at temperatures in excess of about 65° C. at pH in excess of about 9 for periods of time of at least 20 minutes, or at least 30 minutes, or still more preferably at least 40 minutes.

The enzyme-containing multi-use detergent use solutions according to embodiments of the invention can be obtained by contacting an enzyme-containing detergent composition with water and/or adding an enzyme source to a detergent use solution. For example, according to embodiments of the invention, the aqueous use solutions can be obtained by contacting a detergent composition and an enzyme composition with a water source, by contacting a combination detergent/enzyme composition with a water source, and/or providing an enzyme source directly to an aqueous use solution of a detergent composition. Accordingly, the detergent composition and enzyme composition (or enzyme source) may be formulated in combination or separately according to use in the methods of the invention. The active level of the aqueous use solution is adjusted to a desired level through control of variables such as the amount of active enzymes in the detergent and enzyme compositions, length of time and the temperature at which the water contacts the detergent and enzyme compositions, and the like.

The particular enzyme or combination of enzymes for use according to embodiments of the invention can vary according to factors including for example, applications of use for the stabilized use solutions, physical product form, use pH, use temperature, and soil types to be cleaned. According to the invention, the enzyme(s) are selected to provide optimum activity and stability for a given set of utility conditions as one skilled in the art will recognize based on the disclosure of the claimed invention. In a preferred aspect, protease enzymes are particularly suitable for use under high temperature detergent applications.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
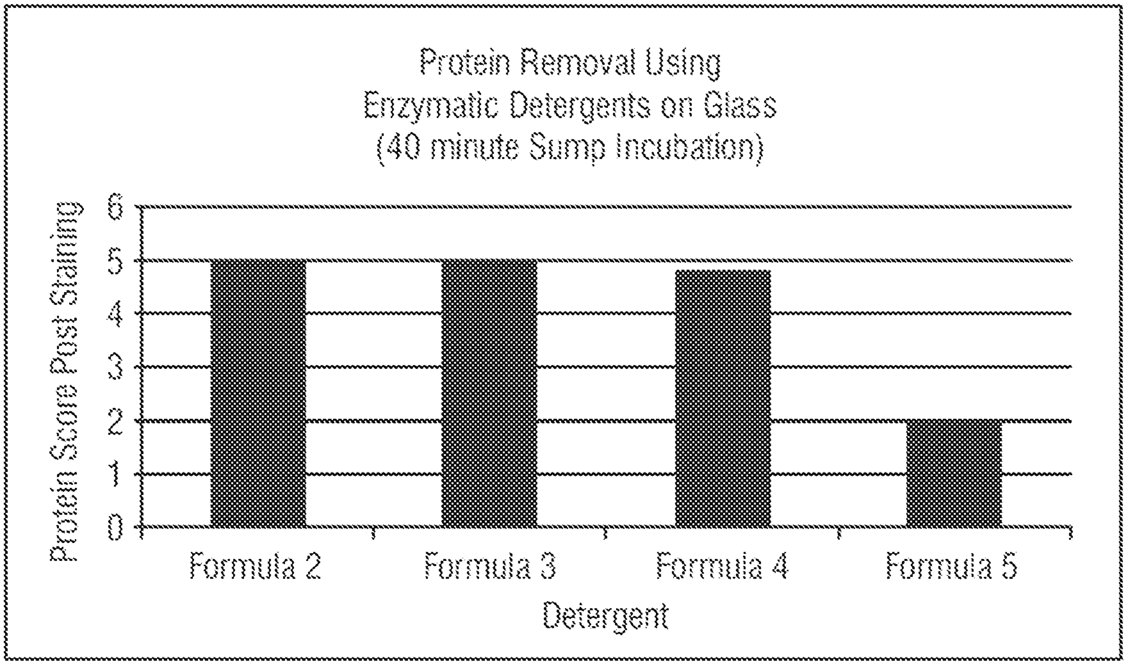
FIGS. 1-2 show protein removal scores for glass substrates (FIG. 1) and plastic substrates (FIG. 2) using enzymatic detergents according to embodiments of the invention as measured after 40 minutes sump incubation.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The embodiments of this invention are not limited to particular methods of stabilizing multi-use detergent use solutions and compositions of the same using enzymes in detergent applications of use, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers defining the range and include each integer within the defined range.

Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities refers to variation in the numerical quantity that can occur.

As used herein, the term "cleaning" refers to a method used to facilitate or aid in soil removal, bleaching, microbial population reduction, and any combination thereof. As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

As used herein, the phrase "food product" includes any food substance that might require treatment with an antimicrobial agent or composition and that is edible with or without further preparation. Food products include meat (e.g. red meat and pork), seafood, poultry, produce (e.g., fruits and vegetables), eggs, living eggs, egg products, ready to eat food, wheat, seeds, roots, tubers, leafs, stems, corns, flowers, sprouts, seasonings, or a combination thereof. The term "produce" refers to food products such as fruits and vegetables and plants or plant-derived materials that are typically sold uncooked and, often, unpackaged, and that can sometimes be eaten raw.

As used herein, the term "ware" refers to items such as eating and cooking utensils, dishes, and other hard surfaces such as showers, sinks, toilets, bathtubs, countertops, windows, mirrors, transportation vehicles, and floors. As used herein, the term "warewashing" refers to washing, cleaning, or rinsing ware. Ware also refers to items made of plastic. Types of plastics that can be cleaned with the compositions according to the invention include but are not limited to, those that include polycarbonate polymers (PC), acrilonitrile-butadiene-styrene polymers (ABS), and polysulfone polymers (PS). Another exemplary plastic that can be cleaned using the compounds and compositions of the invention include polyethylene terephthalate (PET).

The term "water," and "water source," and the like, as used herein, refer to water sources employed in ware wash and other detergent applications of use according to the invention. Water is used according to embodiments of the invention to generate a detergent use solution and circulate or re-circulate the water containing detergents or other cleaning agents (including enzymes) used in cleaning applications to treat various surfaces. According to certain regulated cleaning applications, water sources are required to be regularly discarded and replaced with clean water for use in cleaning applications. For example, certain regulations require water to be replaced at least every four hours to maintain sufficiently clean water sources for cleaning applications. According to the invention, water is not limited according to the source of water. Exemplary water sources suitable for use include, but are not limited to, water from a municipal water source, or private water system, e.g., a public water supply or a well, or any water source including those containing hardness ions. The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The term "actives" or "percent actives" or "percent by weight actives" or "actives concentration" are used interchangeably herein and refers to the concentration of those ingredients involved in cleaning expressed as a percentage minus inert ingredients such as water or salts. The concentrations and weight percentages of enzymes referred to throughout the application are not expressed in "actives" (e.g. active enzyme protein) and instead refer to the concentration and weight percentages of raw material.

According to an embodiment of the invention, enzymes are included in detergent use solutions according to the methods of the invention to effectively remove soils and prevent soil redeposition to clean substrates using low phosphorus detergent compositions.

Detergent Use Compositions

Exemplary ranges of the solid detergent compositions according to the invention are shown in Table 1 in weight percentage of the detergent compositions.

TABLE 1

| Material | First Exemplary Range wt-% | Second Exemplary Range wt-% | Third Exemplary Range wt-% | Fourth Exemplary Range wt-% |
|---|---|---|---|---|
| Alkali metal carbonate | 30-90 | 50-90 | 50-85 | 60-85 |
| Water | 1-50 | 1-30 | 5-30 | 5-20 |
| Enzyme | 0.01-40 | 0.01-30 | 0.01-10 | 0.1-5 |
| Stabilizing agent | 0.01-30 | 0.01-25 | 0.01-20 | 0.1-10 |
| Additional functional ingredient(s) | 0-50 | 0.01-40 | 0.1-40 | 1-25 |

The detergent use compositions beneficially provide stabilized enzymes for improved detergency according to embodiments of the invention, namely provide stability of enzymes for use under warewash conditions including high temperatures for periods of at least 20 minutes. The various enzymes employed, preferably protease enzymes, are combined with a stabilizing agent(s) to control stability and cleaning efficacy of the cleaning compositions under cleaning conditions, namely elevated temperatures and pH conditions. In an aspect, the stabilized use composition maintains enzyme efficacy under temperature and pH conditions of at least about 60° C. and pH of at least about 9, under temperature and pH conditions of at least about 65° C. and pH of at least about 9, and preferably under temperature and pH conditions of at least about 65-80° C. and pH between about 9 and about 11.5. The enzyme stability is confirmed using enzyme assays to demonstrate the use solution maintains at least substantially similar detergency at such elevated temperature and pH conditions for at least about 20 minutes or greater. In some aspects, the enzyme stability under the elevated temperature and pH condition is for at least about 40 minutes, at least about 60 minutes, at least about 90 minutes, at least about 2 hours, or greater.

The multi-use detergent use compositions employing the enzyme stabilizing agent results in at least about 30% enzyme activity retention, at least about 35% enzyme retention, at least about 40% enzyme retention, at least about 45% enzyme retention, at least about 50% enzyme retention, at least about 55% enzyme retention, at least about 60% enzyme retention, at least about 65% enzyme retention, at least about 70% enzyme retention, or at least about 75% enzyme retention or greater at high alkalinity and high temperature conditions for the extended periods of time set forth herein. According to the invention, such retention of enzyme activity in use solutions under the high alkalinity and high temperature conditions have not previously been achieved and demonstrate a significant benefit of the present invention.

The compositions according to the invention are preferably provided as multi-use or multi-dose solid concentrates to be diluted to form use compositions or aqueous use solutions. A concentrate refers to a composition that is intended to be diluted with water to provide a use solution that contacts an object to provide the desired cleaning, rinsing, or the like. The detergent composition that contacts the articles to be washed can be referred to as a concentrate or a use composition (or use solution) dependent upon the formulation employed in methods according to the invention. It should be understood that the concentration of the alkali metal carbonate, enzyme, enzyme stabilizing agent and other optional functional ingredients in the detergent composition will vary depending on whether the detergent composition is provided as a concentrate or as a use solution. As further set forth according to the invention, not all components need be prepared as a concentrate; for example a detergent composition can be provided in combination with components (e.g. enzymes and/or stabilizing agents) as a use solution.

In an alternate embodiment, the multi-use cleaning compositions may be provided as a ready-to-use (RTU) composition. If the cleaning composition is provided as a RTU composition, a more significant amount of water is added to the cleaning composition as a diluent. When the concentrate is provided as a solid, first an aqueous solution is obtained and then may be further diluted to provide it in a flowable form so that it can be pumped or aspirated. It has been found that it is generally difficult to accurately pump a small amount of a liquid. It is generally more effective to pump a larger amount of a liquid. Accordingly, although it is desirable to provide the concentrate with as little as possible water in order to reduce transportation costs, it is also desirable to provide a concentrate that can be dispensed accurately.

In an aspect of the invention, a use solution is generated from the solid multi-use detergent compositions of Table 1 having a range of dilution from about 1:10 to 1:10,000. In an aspect of the invention, a use solution of the stabilized detergent composition has between about 1 ppm to about 2500 ppm alkali metal carbonate, between about 1 ppm to about 1000 ppm actives stabilizing agent, and between 1 ppm to about 200 ppm enzyme. In addition, without being limited according to the invention, all ranges recited are inclusive of the numbers defining the range and include each integer within the defined range.

In some embodiments of the invention, the solid multi-use compositions and/or use solutions described above can be substantially free of phosphorus or phosphorus-free. In additional aspects, the solid compositions and/or use solutions described above can be substantially free of NTA or NTA-free. In additional aspects, the solid compositions and/or use solutions described above contain less than 0.5 wt-% phosphorus and/or NTA.

The solid multi-use detergent compositions are preferably solid blocks providing shelf-stability for a composition containing a protease enzyme. The use of solidification technology and solid block detergents for institutional and industrial operations is set forth for example with respect to the SOLID POWER® brand technology such as disclosed in U.S. Reissue Pat. Nos. 32,762 and 32,818, and includes sodium carbonate hydrate cast solid products as disclosed by Heile et al., U.S. Pat. Nos. 4,595,520 and 4,680,134. Each of these references are herein incorporated by reference in its entirety. Without being limited according to a mechanism of action, the solidification mechanism is ash hydration or the interaction of the sodium carbonate with water. According to the invention, the solid detergent compositions include any pressed, extruded or cast solid composition and loose powder forms. In a preferred aspect, the solid detergent composition is pressed and/or extruded.

Detergent Composition

Methods according to the invention use an aqueous use solution comprising, consisting of and/or consisting essentially of an alkaline detergent composition, preferably an alkali metal carbonate detergent, enzyme(s) and a stabilizing agent. The stabilized use solution of the detergent composition and enzyme(s) beneficially results in the stabilization of the enzymes and/or the use solution itself. In other aspects, the enzymes and/or stabilizing agents may be formulated in separate compositions and/or provided at a point of use to generate the use solution comprising, consisting of and/or consisting essentially of an alkaline detergent composition, preferably an alkali metal carbonate detergent, enzyme(s) and a stabilizing agent.

Unlike most cleaning compositions currently known in the art, the cleaning compositions do not have to include phosphates to be effective. Thus, the cleaning compositions of the present invention provide a green replacement for conventional cleaning compositions. The detergent composition can be phosphorus-free and/or nitrilotriacetic acid (NTA)-free to make the cleaning composition more environmentally beneficial. Phosphorus-free means a composition having less than approximately 0.5%, more particularly less than approximately 0.1 wt %, and even more particularly less than approximately 0.01 wt % phosphorus based on the total weight of the composition. This includes phosphates, phosphonates, phosphites or mixtures thereof. NTA-free means a composition having less than approximately 0.5 wt %, less than approximately 0.1 wt %, and particularly less than approximately 0.01 wt % NTA based on the total weight of the composition. In some aspects, when the composition is NTA-free, it may also be compatible with chlorine, which functions as an anti-redeposition and stain-removal agent. However, in some aspects of the invention, the compositions do not include chlorine due to incompatibility with enzymes.

Alkalinity Source

The detergent composition includes an effective amount of one or more alkalinity sources. An effective amount of one or more alkaline sources should be considered as an amount that controls the pH of the resulting use solution when water is added to the detergent composition to form a use solution. The pH of the use solution must be maintained in the alkaline range in order to provide sufficient detergency properties. In one embodiment, the pH of the use solution is between approximately 9 and approximately 13. If the pH of the use solution is too low, for example, below approximately 9, the use solution may not provide adequate detergency properties. If the pH of the use solution is too high, for example, above approximately 13, the use solution may be too alkaline and attack or damage the surface to be cleaned.

According to a preferred embodiment, alkalinity source provides a composition having a pH between about 7 and about 12. In a particular embodiment the cleaning composition will have a pH of between about 8 and about 12. In a particular embodiment the cleaning composition will have a pH between about 9 and about 11.5. During the wash cycle the use solution will have a pH between about 8 and about 11.5, preferably between about 9 and about 11.5. As the use solutions according to the present invention include an enzyme composition, the pH may be further modulated to provide the optimal pH range for the enzyme compositions effectiveness. In a particular embodiment of the invention incorporating a stabilized enzyme composition in the cleaning composition, the optimal pH is about 9.0 to about 11.5. In another particular embodiment of the invention a use solution having an actives concentration from about 0.01 to 0.5 wt-% has a pH of between about 9 and about 13, or preferably a use solution having an actives concentration from about 0.01 to 0.25 wt-% has a pH of between about 9 and about 11.5.

Examples of suitable alkaline sources of the cleaning composition include, but are not limited to carbonate-based alkalinity sources, including, for example, carbonate salts such as alkali metal carbonates; caustic-based alkalinity sources, including, for example, alkali metal hydroxides; other suitable alkalinity sources may include metal silicate, metal borate, and organic alkalinity sources.

The detergent compositions according to the invention are preferably alkali metal carbonate detergents. Exemplary alkali metal carbonates that can be used include, but are not limited to: sodium or potassium carbonate, bicarbonate, sesquicarbonate, and mixtures thereof.

In an alternative embodiment, the detergent compositions may further include alkali metal silicates. Examples of alkali metal silicates include, but are not limited to sodium or potassium silicate or polysilicate, sodium or potassium metasilicate and hydrated sodium or potassium metasilicate or a combination thereof. In preferred aspects, the detergent compositions do not include alkali metal silicates.

In an additional embodiment, the detergent composition may include a further alkalinity source, such as caustic-based alkalinity sources, including, for example, alkali metal hydroxides. Exemplary alkali metal hydroxides that can be used include, but are not limited to sodium, lithium, or potassium hydroxide. In preferred aspects, the detergent compositions do not include alkali metal hydroxides.

In a still further alternative embodiment, the detergent compositions may further include an organic alkalinity source, including for example strong nitrogen bases including, for example, ammonia, amines, alkanolamines, and amino alcohols. Typical examples of amines include primary, secondary or tertiary amines and diamines carrying at least one nitrogen linked hydrocarbon group, which represents a saturated or unsaturated linear or branched alkyl group having at least 10 carbon atoms and preferably 16-24 carbon atoms, or an aryl, aralkyl, or alkaryl group containing up to 24 carbon atoms, and wherein the optional other nitrogen linked groups are formed by optionally substituted alkyl groups, aryl group or aralkyl groups or polyalkoxy groups. Typical examples of alkanolamines include monoethanolamine, monopropanolamine, diethanolamine, dipropanolamine, triethanolamine, tripropanolamine and the like. Typical examples of amino alcohols include 2-amino-2-methyl-1-propanol, 2-amino-1-butanol, 2-amino-2-methyl-1,3-propanediol, 2-amino-2-ethyl-1,3-propanediol, hydroxymethyl aminomethane, and the like. In preferred aspects, the detergent compositions do not include an organic alkalinity source.

The alkaline detergent composition, preferably the alkali metal carbonate of the composition may also function as a hydratable salt to form a solid detergent, namely a cast solid. The hydratable salt can be referred to as substantially anhydrous. By substantially anhydrous, it is meant that the component contains less than about 2% by weight water based upon the weight of the hydratable component. The amount of water can be less than about 1% by weight, and can be less than about 0.5% by weight. There is no requirement that the hydratable component be completely anhydrous.

According to the invention, the detergent composition may be liquids or solids, including for example molded compositions, as are appreciated by those skilled in the art. Pastes and gels can be considered types of liquid. Powders, agglomerates, pellets, tablets, and blocks can be considered types of solid. For example, detergent compositions may be provided in the form of blocks, pellets, powders (i.e., mixture of granular dry material), agglomerates and/or liquids under room temperature and atmosphere pressure conditions. Powder detergents are often prepared by mixing dry materials or by mixing a slurry and drying the slurry. Pellets and blocks are typically provided with a size that is determined by the shape or configuration of the mold or extruder through which the detergent composition is compressed. Pellets are generally characterized as having an average diameter of about 0.5 cm to about 2 cm. Blocks are generally characterized as having an average diameter of greater than about 2 cm, preferably between about 2 cm and about 2 ft, and can have an average diameter of between about 2 cm and about 1 ft. According to a preferred embodiment, a solid block is at least 50 grams.

Additional description of detergent compositions, and methods of formation of the same, suitable for use according to the invention are disclosed, for example, in U.S. Pat. Nos. 7,674,763, 7,153,820, 7,094,746, 7,037,886, 6,924,257 and 6,730,653, the contents of which are incorporated by reference in its entirety.

Enzyme Compositions

The enzyme compositions for use in the compositions and methods according to the invention provides enzymes for enhanced removal of soils, prevention of redeposition and additionally the reduction of foam in use solutions of the cleaning compositions. The purpose of the enzyme composition is to break down adherent soils, such as starch or proteinaceous materials, typically found in soiled surfaces and removed by a detergent composition into a wash water source. The enzyme compositions remove soils from substrates and prevent redeposition of soils on substrate surfaces. Enzymes provide additional cleaning and detergency benefits, such as anti-foaming. Without being limited to a particular mechanism of action according to the detergency of the use solutions according to the invention, the enzymes in the detergent use solutions beneficially enhance removal of soils, in particular protein removal with the use of protease enzymes, prevent redeposition of soils, and reduce foaming, including for example foam height in use solutions of the detergent and enzyme compositions. The combined benefits of a low-foaming, detersive enzyme use solution allows both the extended lifetime of the sump water for use in warewash application and the improved cleaning of ware (and other articles).

Exemplary types of enzymes which can be incorporated into detergent compositions or detergent use solutions include amylase, protease, lipase, cellulase, cutinase, gluconase, peroxidase and/or mixtures thereof. An enzyme composition according to the invention may employ more than one enzyme, from any suitable origin, such as vegetable, animal, bacterial, fungal or yeast origin. However, according to a preferred embodiment of the invention, the enzyme is a protease. As used herein, the terms "protease" or "proteinase" refer enzymes that catalyze the hydrolysis of peptide bonds.

As one skilled in the art shall ascertain, enzymes are designed to work with specific types of soils. For example, according to an embodiment of the invention, ware wash applications may use a protease enzyme as it is effective at the high temperatures of the ware wash machines and is effective in reducing protein-based soils. Protease enzymes are particularly advantageous for cleaning soils containing protein, such as blood, cutaneous scales, mucus, grass, food (e.g., egg, milk, spinach, meat residue, tomato sauce), or the like. Protease enzymes are capable of cleaving macromolecular protein links of amino acid residues and convert substrates into small fragments that are readily dissolved or dispersed into the aqueous use solution. Proteases are often referred to as detersive enzymes due to the ability to break soils through the chemical reaction known as hydrolysis. Protease enzymes can be obtained, for example, from *Bacillus subtilis, Bacillus licheniformis* and *Streptomyces griseus*. Protease enzymes are also commercially available as serine endoproteases.

Examples of commercially-available protease enzymes are available under the following trade names: Esperase, Purafect, Purafect L, Purafect Ox, Everlase, Liquanase, Savinase, Prime L, Prosperase and Blap.

According to the invention, the enzyme composition may be varied based on the particular cleaning application and the types of soils in need of cleaning. For example, the temperature of a particular cleaning application will impact the enzymes selected for an enzyme composition according to the invention. Ware wash applications, for example, clean substrates at temperatures in excess of approximately 60° C., or in excess of approximately 70° C., or between approximately 65°-80° C., and enzymes such as proteases are desirable due to their ability to retain enzymatic activity at such elevated temperatures.

The enzyme compositions according to the invention may be an independent entity and/or may be formulated in combination with a detergent composition. According to an embodiment of the invention, an enzyme composition may be formulated into a detergent composition in either liquid or solid formulations. In addition, enzyme compositions may be formulated into various delayed or controlled release formulations. For example, a solid molded detergent composition may be prepared without the addition of heat. As a skilled artisan will appreciate, enzymes tend to become denatured by the application of heat and therefore use of enzymes within detergent compositions require methods of forming a detergent compositions that does not rely upon heat as a step in the formation process, such as solidification.

The enzyme composition may further be obtained commercially in a solid (i.e., puck, powder, etc.) or liquid formulation. Commercially-available enzymes are generally combined with stabilizers, buffers, cofactors and inert vehicles. The actual active enzyme content depends upon the method of manufacture, which is well known to a skilled artisan and such methods of manufacture are not critical to the present invention.

Alternatively, the enzyme composition may be provided separate from the detergent composition, such as added directly to the wash liquor or wash water of a particular application of use, e.g. dishwasher.

Additional description of enzyme compositions suitable for use according to the invention is disclosed for example in U.S. Pat. Nos. 7,670,549, 7,723,281, 7,670,549, 7,553,806, 7,491,362, 6,638,902, 6,624,132, and 6,197,739 and U.S. Patent Publication Nos. 2012/0046211 and 2004/0072714, each of which are herein incorporated by reference in its entirety. In addition, the reference "Industrial Enzymes", Scott, D., in Kirk-Othmer Encyclopedia of Chemical Technology, 3rd Edition, (editors Grayson, M. and EcKroth, D.) Vol. 9, pp. 173-224, John Wiley & Sons, New York, 1980 is incorporated herein in its entirety.

In a preferred aspect, the enzyme compositions are provided in a solid composition in an amount between about 0.01% to about 40%, between about 0.01% to about 30%, between about 0.01% to about 10%, between about 0.1% to about 5%, and preferably between about 0.5% to about 1%.

Stabilizing Agents

The enzyme compositions for use in the methods of the present invention further include stabilizers (referred to herein as stabilizing agent(s)) which may be dispensed manually or automatically into a use solution of the detergent composition and/or enzyme composition to stabilize the enzyme from loss of activity (i.e. retain proteolytic activity or enzymatic retention under the alkaline and high temperature conditions). In a preferred embodiment, a stabilizing agent and enzyme are formulated directly into the alkali metal carbonate detergent according to the invention. The formulations of the detergent composition and/or the enzyme composition may vary based upon the particular enzymes and/or stabilizing agents employed. Starch-based and/or protein-based stabilizing agents are preferred stabilizing agents. In an aspect, the stabilizing agent is a starch, poly sugar, amine, amide, polyamide or poly amine. In still further aspects, the stabilizing agent may be a combination of any of the aforementioned stabilizing agents.

Protein Stabilizing Agents

In an embodiment, the stabilizing agent may include a nitrogen-containing group, including a quaternary nitrogen group to increase the stability of the enzyme. In a preferred aspect, the stabilizing agent is a proteinaceous material. A protein or proteinaceous material can include casein, gelatin, collagen, or the like. In an embodiment, the protein stabilizing agent is present in a use solution at a concentration from about 100-2000 ppm actives, preferably about 100-2000 ppm actives, or more preferably from about 100-1000 ppm actives. In an embodiment, the stabilizing agent to enzyme ratio is from about 10:1 to about 200:1, or from about 10:1 to about 100:1.

In an aspect, the protein stabilizing agents have an average molecular weight from about 10,000 to 500,000, from about 30,000 to 250,000, or from about 50,000 to 200,000 (such as for casein). Exemplary proteins suitable for use according to the invention include, for example, casein and gelatin. Combinations of such exemplary proteins may also be used according to the invention. A commercially-available example is Amino 1000 (GNC) providing a combination of caseinate and gelatin proteins along with other ingredients, such as Vitamin E and soy lecithin. In some aspects, the protein stabilizing agents do not include small molecule amino acids having molecular weights below the identified ranges set forth herein.

In an aspect, the protein stabilizing agents may be soluble or dispersible in water. In a further aspect, the protein stabilizing agents may include denatured or unraveled proteins. Various commercially-available proteins (e.g. casein) are sold as powders and exist as long chemical chains. Commercially as powders, the protein chains fold upon themselves and form hydrogen bonds holding the protein in a globular form. In an aspect, the unravelling or denaturing the protein forms a more random structure and can be achieved by methods known in the art, such as boiling in water. In an aspect, the denatured proteins are employed for enzyme stability.

In an aspect, the protein stabilizing agent can also include a protein hydrolysate, a polypeptide, or a natural or synthetic analog of a protein hydrolysate or polypeptide. The term "hydrolysate" refers to any substance produced by hydrolysis, without being limited to a particular substance produced by any specific method of hydrolysis. The term is intended to include "hydrolysates" produced by enzymatic as well as non-enzymatic reactions. "Protein hydrolysate" refers to a hydrolysate produced by hydrolysis of a protein of any type or class, which also may be produced by enzymatic or non-enzymatic methods. Exemplary protein hydrolysates may include: protein hydrolysate from wheat gluten, soy protein acid hydrolysate, casein acid hydrolysate from bovine milk, and the like.

In an aspect, the protein stabilizing agents are not antimicrobial agents, such as amines. The amine refers to primary, secondary, or tertiary amines. In an aspect, the protein stabilizing agents are not antimicrobial amines and/or quaternary ammonium compounds.

Starch-Based Stabilizing Agent

In an embodiment, the stabilizing agent may include a starch-based stabilizing agent and optionally an additional food soil component (e.g. fat and/or protein to modify the starch-based stabilizing agent). In an aspect, the stabilizing agent is a starch, polysaccharide, or poly sugar. In an embodiment, the starch stabilizing agent is present in a use solution at a concentration from about 10-2000 ppm actives, preferably about 100-2000 ppm actives, or more preferably from about 100-1000 ppm actives. In an embodiment, the stabilizing agent to enzyme ratio is from about 10:1 to about 200:1, or from about 10:1 to about 100:1.

Starches are suitable stabilizing agents according to the invention. Starches refer to food reserve materials from plants and/or animals. Starches contain two primary polysaccharide components, the linear species amylose and the highly branched species amylopectin.

Polysaccharides are suitable stabilizing agents according to the invention. As referred to herein, polysaccharides are high molecular weight carbohydrates, including for example, condensation polymers of monosaccharide residues, most commonly five or more monosaccharide residues. Polysaccharides may be substituted or substituted, and/or branched or linear and have a linkages and/or β linkages or bonds between the saccharide monomers (e.g. glucose, arabinose, mannose, etc.).

In an aspect, the polysaccharides have a terminal group with α-1,4 linked substituted or substituted glucose monomers, anhydroglucose monomers, terminal anhydroglucose monomers, or combinations thereof. A used herein "terminal" means the monomer or group of monomers present on an end or terminal portion of a polysaccharide. All polysaccharides as described herein have at least two terminal portions, with unsubstituted linear polysaccharides having two terminal portions, substituted linear polysaccharides having at least two terminal portions, and substituted or unsubstituted, branched polysaccharides having at least three terminal portions.

In another aspect, the polysaccharides have a terminal group with at least three α-1,4 linked substituted or unsubstituted glucose monomers, anhydroglucose monomers, terminal anhydroglucose monomers, or combinations thereof.

In an embodiment, the polysaccharide enzyme stabilizer is a homo or hetero polysaccharide, such as, a polysaccharide comprising only α-linkages or bonds between the saccharide monomers. By α-linkages between the saccharide monomers it is understood to have its conventional meaning, that is the linkages between the saccharide monomers are of the a anomer, such as for example, the disaccharide (+) maltose or 4-O-(α-D-glucopyranosyl)-D-glucopyranose, the disaccharide (+)-cellobiose or 4-O-(β-D-Glucopyranosyl)-D-glucopyranose.

In another aspect, the polysaccharide enzyme stabilizer is a homo or hetero polysaccharide, and may comprise only glucose monomers, or a polysaccharide comprising only glucose monomers wherein a majority of the glucose monomers are linked by α-1,4 bonds. Glucose is an aldohexose or a monosaccharide containing six carbon atoms. It is also a reducing sugar (e.g. glucose, arabinose, mannose, etc., most disaccharides, i.e., maltose, cellobiose and lactose).

In another embodiment, the polysaccharide enzyme stabilizer is a substituted or unsubstituted glucose monomer having any ratio of α-1,4 linked monomers to α-1,6 linked monomers. Accordingly, the glucose monomer may be connected to the polysaccharide chain via any suitable location (e.g. 1, 4 or 6 position). The number of α-1,4, α-1,6, α-1,3, α-2,6 bonds can be determined by examining the $^{1}H$ NMR spectra (proton NMR) of any particular enzyme stabilizer.

Poly sugars are suitable stabilizing agents according to the invention. Beneficially, poly sugars are biodegradable and often classified as Generally Recognized As Safe (GRAS).

Exemplary stabilizing agents include, but are not limited to: amylose, amylopectin, pectin, inulin, modified inulin, potato starches (e.g. potato buds/flakes), modified potato starch, corn starch, modified corn starch, wheat starch, modified wheat starch, rice starch, modified rice starch, cellulose, modified cellulose, dextrin, dextran, maltodextrin, cyclodextrin, glycogen, oligiofructose and other soluble or partially soluble starches. Particularly suitable stabilizing agents include, but are not limited to: inulin, carboxymethyl inulin, potato starch, sodium carboxymethylcellulose, linear sulfonated alpha-(1,4)-linked D-glucose polymers, cyclodextrin and the like. Combinations of stabilizing agents may also be used according to embodiments of the invention. Modified stabilizing agents may also be used wherein an additional food soil component is combined with the stabilizing agent (e.g. fat and/or protein).

In an embodiment, the starch-based stabilizing agent is an amylopectin and/or amylose containing starch. In a further embodiment, the stabilizing agent is a potato starch. In a still further embodiment, the starch-based stabilizing agent is an amylopectin and/or inulin containing starch, such as a potato starch that is modified (e.g. combined) with a protein.

Stabilizing Agent Formulations

The stabilizing agents according to the invention may be an independent entity and/or may be formulated in combination with a detergent composition and/or enzyme composition. According to an embodiment of the invention, a stabilizing agent may be formulated into a multi-use detergent composition (with or without the enzyme) in either liquid or solid formulations. In addition, stabilizing agent compositions may be formulated into various delayed or controlled release formulations. For example, a solid molded detergent composition may be prepared without the addition of heat. Alternatively, the stabilizing agent may be provided separate from the detergent and/or enzyme composition, such as added directly to the wash liquor or wash water of a particular application of use, e.g. dishwasher.

In a preferred aspect, the stabilizing agent is formulated into a concentrated solid detergent with enzymes.

In preferred aspects, the stabilizing agents provide the only stabilization required for the enzymes in the detergent formulations. In such a preferred aspect no other stabilizing agents are employed, such as for example any one or more of the following stabilizing agents: boron compounds (e.g. borax, boric oxide, alkali metal borates, boric acid esters, alkali metal salts of boric acid, and the like), and calcium compounds. In a preferred embodiment, the stabilizing agents and detergent compositions are free of boric acid or a boric acid salt.

Water

The embodiments of the invention many include water in the detergent compositions and/or use solutions. Those of skill in the art will be capable of selecting the grade of water desired with the desired level of water hardness and grain.

Additional Components

Compositions and methods according to the invention using an aqueous detergent use solution may further comprise additional components to be used in combination with the enzyme, stabilizing agent, and detergent composition. Additional components which can be incorporated into the enzyme composition, detergent composition, combined enzyme and detergent composition and/or added independently to the water source include for example, solvents, polymers, dyes, fragrances, anti-redeposition agents, solubility modifiers, dispersants, rinse aids, corrosion inhibitors, buffering agents, defoamers, antimicrobial agents, preservatives, chelators, bleaching agents, additional stabilizing agents and combinations of the same.

Additional functional ingredients provide desired properties and functionalities to the compositions of the invention. For the purpose of this application, the term "functional ingredient" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in cleaning, specifically ware wash applications. However, other embodiments may include functional ingredients for use in other applications.

Polymer Systems

The present invention includes a polymer system comprised of at least one polycarboxylic acid polymer, copolymer, and/or terpolymer. In a preferred embodiment, the polymer system comprises at least two polycarboxylic acid polymers, copolymers, and/or terpolymers. In a most preferred embodiment, the polymer system comprises at least three polycarboxylic acid polymers, copolymers, and/or terpolymers. Particularly suitable polycarboxylic acid polymers of the present invention, include, but are not limited to, polymaleic acid homopolymers, polyacrylic acid copolymers, and maleic anhydride/olefin copolymers. Polymaleic acid $(C_4H_2O_3)x$ or hydrolyzed polymaleic anhydride or cis-2-butenedioic acid homopolymer, has the structural formula:

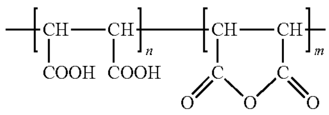

where n and m are any integer. Examples of polymaleic acid homopolymers, copolymers, and/or terpolymers (and salts thereof) which may be used for the invention are particularly preferred are those with a molecular weight of about 0 and about 5000, more preferably between about 200 and about 2000 (can you confirm these MWs). Commercially available polymaleic acid homopolymers include the Belclene 200 series of maleic acid homopolymers from BWA™ Water Additives, 979 Lakeside Parkway, Suite 925 Tucker, Ga. 30084, USA and Aquatreat AR-801 available from AkzoNobel. The polymaleic acid homopolymers, copolymers, and/or terpolymers may be present in the polymer system from about 25 wt-% to about 55 wt-%, about 30 wt-% to about 50 wt-%, or about 35 wt-% to about 47 wt-% at actives concentration.

The multi-use detergent compositions of the present invention can use polyacrylic acid polymers, copolymers, and/or terpolymers. Poly acrylic acids have the following structural formula:

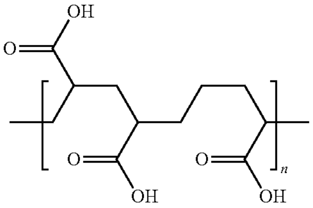

where n is any integer. Examples of suitable polyacrylic acid polymers, copolymers, and/or terpolymers, include but are not limited to, the polymers, copolymers, and/or terpolymers of polyacrylic acids, $(C_3H_4O_2)_n$ or 2-Propenoic acid, acrylic acid, polyacrylic acid, propenoic acid.

In an embodiment of the present invention, particularly suitable acrylic acid polymers, copolymers, and/or terpolymers have a molecular weight between about 100 and about 10,000, in a preferred embodiment between about 500 and about 7000, in an even more preferred embodiment between about 1000 and about 5000, and in a most preferred embodiment between about 1500 and about 3500. Examples of polyacrylic acid polymers, copolymers, and/or terpolymers (or salts thereof) which may be used for the invention include, but are not limited to, Acusol 448 and Acusol 425 from The Dow Chemical Company, Wilmington Del., USA. In particular embodiments it may be desirable to have acrylic acid polymers (and salts thereof) with molecular weights greater than about 10,000. Examples, include but are not limited to, Acusol 929 (10,000 MW) and Acumer 1510 (60,000 MW) both also available from Dow Chemical, AQUATREAT AR-6 (100,000 MW) from AkzoNobel Strawinskylaan 2555 1077 ZZ Amsterdam Postbus 75730 1070 AS Amsterdam. The polyacrylic acid polymer, copolymer, and/or terpolymer may be present in the polymer system from about 25 wt-% to about 55 wt-%, about 30 wt-% to about 50 wt-%, or about 35 wt-% to about 47 wt-% at actives concentration.

Maleic anhydride/olefin copolymers are copolymers of polymaleic anhydrides and olefins. Maleic anhydride (C2H2 (CO)2O has the following structure:

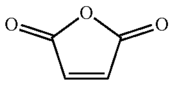

A part of the maleic anhydride can be replaced by maleimide, N-alkyl($C_{1-4}$) maleimides, N-phenyl-maleimide, fumaric acid, itaconic acid, citraconic acid, aconitic acid, crotonic acid, cinnamic 10 acid, alkyl ($C_{1-18}$) esters of the foregoing acids, cycloalkyl($C_{3-8}$) esters of the foregoing acids, sulfated castor oil, or the like. At least 95 wt % of the maleic anhydride polymers, copolymers, or terpolymers have a number average molecular weight of in the range between about 700 and about 20,000, preferably between about 1000 and about 100,000.

A variety of linear and branched chain alpha-olefins can be used for the purposes of this invention. Particularly useful alpha-olefins are diener containing 4 to 18 carbon atoms, such as butadiene, chloroprene, isoprene, and 2-methyl-1, 5-hexadiene; 1-alkenes containing 4 to 8 carbon atoms, preferably $C_{4-10}$, such as isobutylene, 1-butene, 1-hexene, 1-octene, and the like.

In an embodiment of the present invention, particularly suitable maleic anhydride/olefin copolymers have a molecular weight between about 1000 and about 50,000, in a preferred embodiment between about 5000 and about 20,000, and in a most preferred embodiment between about 7500 and about 12,500. Examples of maleic anhydride/olefin copolymers which may be used for the invention include, but are not limited to, Acusol 460N from The Dow Chemical Company, Wilmington Del., USA. The maleic anhydride/olefin copolymer may be present in the polymer system from about 5 wt-% to about 35 wt-%, about 7 wt-% to about 30 wt-%, or about 10 wt-% to about 25 wt-% at actives concentration.

In general, it is expected that the compositions will include the polymer system in an amount between about 0 wt-% and about 20 wt-%, between about 0.01 wt-% and about 15 wt-%, and between about 1 wt-% and about 10 wt-% at actives concentration. The polymer system of the present invention can comprise, consist essentially of, or consist of at least one polymaleic acid hompolymer, copolymer, and/or terpolymer; at least one polyacrylic acid polymer, copolymer, and/or terpolymer; and at least one maleic anhydride/olefin copolymer. In an embodiment of the invention, the polymer system comprises at least one polymaleic acid homopolymer, copolymer, and/or terpolymer; at least one polyacrylic acid polymer, copolymer, and/or terpolymer; and at least one maleic anhydride/olefin copolymer in a ratio relationship between about 1:1:1 and about 2:2:1, or between about 2:2:1 and about 3:3:1. In addition, without being limited according to the invention, all ranges for the ratios recited are inclusive of the numbers defining the range and include each integer within the defined range of ratios.

In an additional aspect, the polycarboxylic acid polymers may also include polymethacrylic acid polymers. An exemplary polymer is available under the tradename Alcosperse 125 (30%) available from Akzonobel.

The polymer system can be in an amount sufficient to provide a desired level of scale control and soil dispersion when used in the use solution. There should be sufficient amount of polymer system to provide the desired scale control inhibiting effect. It is expected that the upper limit on the polymer system will be determined by solubility. In a preferable embodiment, the polymer system is present in a use solution at between about 1 ppm and 500 ppm, more preferably between about 10 ppm and 100 ppm, and most preferably between about 20 ppm and about 50 ppm.

Surfactants

In some embodiments, the compositions of the present invention include a surfactant. The surfactant component functions primarily as a defoamer and as a wetting agent for use solutions according to the invention. Surfactants suitable for use with the compositions of the present invention include, but are not limited to, nonionic surfactants, anionic surfactants, amphoteric surfactants, and zwitterionic surfactants. In some embodiments, the compositions of the present invention include about 0 wt-% to about 50 wt-% of a surfactant at actives concentration. In other embodiments the compositions of the present invention include about 0.1 wt-% to about 30 wt-% of a surfactant at actives concentration. In some embodiments, the compositions of the present invention include about 100 ppm to about 10,000 ppm of a surfactant at actives concentration.

Nonionic Surfactants

Useful nonionic surfactants are generally characterized by the presence of an organic hydrophobic group and an organic hydrophilic group and are typically produced by the condensation of an organic aliphatic, alkyl aromatic or polyoxyalkylene hydrophobic compound with a hydrophilic alkaline oxide moiety which in common practice is ethylene oxide or a polyhydration product thereof, polyethylene glycol. Practically any hydrophobic compound having a hydroxyl, carboxyl, amino, or amido group with a reactive hydrogen atom can be condensed with ethylene oxide, or its polyhydration adducts, or its mixtures with alkoxylenes such as propylene oxide to form a nonionic surface-active agent. The length of the hydrophilic polyoxyalkylene moiety which is condensed with any particular hydrophobic compound can be readily adjusted to yield a water dispersible or water soluble compound having the desired degree of balance between hydrophilic and hydrophobic properties. Useful nonionic surfactants include:

1. Block polyoxypropylene-polyoxyethylene polymeric compounds based upon propylene glycol, ethylene glycol, glycerol, trimethylolpropane, and ethylenediamine as the initiator reactive hydrogen compound. Examples of polymeric compounds made from a sequential propoxylation and ethoxylation of initiator are commercially available under the trade names Pluronic® and Tetronic® manufactured by BASF Corp. Pluronic® compounds are difunctional (two reactive hydrogens) compounds formed by condensing ethylene oxide with a hydrophobic base formed by the addition of propylene oxide to the two hydroxyl groups of propylene glycol. This hydrophobic portion of the molecule weighs from about 1,000 to about 4,000. Ethylene oxide is then added to sandwich this hydrophobe between hydrophilic groups, controlled by length to constitute from about 10% by weight to about 80% by weight of the final molecule. Tetronic® compounds are tetra-flinctional block copolymers derived from the sequential addition of propylene oxide and ethylene oxide to ethylenediamine. The molecular weight of the propylene oxide hydrotype ranges from about 500 to about 7,000; and, the hydrophile, ethylene oxide, is added to constitute from about 10% by weight to about 80% by weight of the molecule.

2. Condensation products of one mole of alkyl phenol wherein the alkyl chain, of straight chain or branched chain configuration, or of single or dual alkyl constituent, contains from about 8 to about 18 carbon atoms with from about 3 to about 50 moles of ethylene oxide. The alkyl group can, for example, be represented by diisobutylene, di-amyl, polymerized propylene, iso-octyl, nonyl, and di-nonyl. These surfactants can be polyethylene, polypropylene, and polybutylene oxide condensates of alkyl phenols. Examples of commercial compounds of this chemistry are available on the market under the trade names Igepal® manufactured by Rhodia and Triton® manufactured by Dow Chemical Company.
3. Condensation products of one mole of a saturated or unsaturated, straight or branched chain alcohol having from about 6 to about 24 carbon atoms with from about 3 to about 50 moles of ethylene oxide. The alcohol moiety can consist of mixtures of alcohols in the above delineated carbon range or it can consist of an alcohol having a specific number of carbon atoms within this range. Examples of like commercial surfactant are available under the trade names Neodol® manufactured by Shell Chemical Co. and Alfonic® manufactured by Sasol North America Inc.
4. Condensation products of one mole of saturated or unsaturated, straight or branched chain carboxylic acid having from about 8 to about 18 carbon atoms with from about 6 to about 50 moles of ethylene oxide. The acid moiety can consist of mixtures of acids in the above defined carbon atoms range or it can consist of an acid having a specific number of carbon atoms within the range. Examples of commercial compounds of this chemistry are available on the market under the trade name Lipopeg™ manufactured by Lipo Chemicals, Inc.

In addition to ethoxylated carboxylic acids, commonly called polyethylene glycol esters, other alkanoic acid esters formed by reaction with glycerides, glycerin, and polyhydric (saccharide or sorbitan/sorbitol) alcohols have application in this invention for specialized embodiments, particularly indirect food additive applications. All of these ester moieties have one or more reactive hydrogen sites on their molecule which can undergo further acylation or ethylene oxide (alkoxide) addition to control the hydrophilicity of these substances. Care must be exercised when adding these fatty ester or acylated carbohydrates to compositions of the present invention containing amylase and/or lipase enzymes because of potential incompatibility.

Examples of nonionic low foaming surfactants include:

5. Compounds from (1) which are modified, essentially reversed, by adding ethylene oxide to ethylene glycol to provide a hydrophile of designated molecular weight; and, then adding propylene oxide to obtain hydrophobic blocks on the outside (ends) of the molecule. The hydrophobic portion of the molecule weighs from about 1,000 to about 3,100 with the central hydrophile including 10% by weight to about 80% by weight of the final molecule. These reverse Pluronics® are manufactured by BASF Corporation under the trade name Pluronic® R surfactants. Likewise, the Tetronic®R surfactants are produced by BASF Corporation by the sequential addition of ethylene oxide and propylene oxide to ethylenediamine. The hydrophobic portion of the molecule weighs from about 2,100 to about 6,700 with the central hydrophile including 10% by weight to 80% by weight of the final molecule.
6. Compounds from groups (1), (2), (3) and (4) which are modified by "capping" or "end blocking" the terminal hydroxy group or groups (of multi-functional moieties) to reduce foaming by reaction with a small hydrophobic molecule such as propylene oxide, butylene oxide, benzyl chloride; and, short chain fatty acids, alcohols or alkyl halides containing from 1 to about 5 carbon atoms; and mixtures thereof. Also included are reactants such as thionyl chloride which convert terminal hydroxy groups to a chloride group. Such modifications to the terminal hydroxy group may lead to all-block, block-heteric, heteric-block or all-heteric nonionics.

Additional examples of effective low foaming nonionics include:

7. The alkylphenoxypolyethoxyalkanols of U.S. Pat. No. 2,903,486 issued Sep. 8, 1959 to Brown et al. and represented by the formula

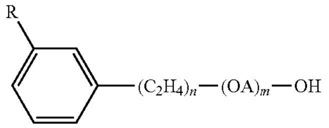

in which R is an alkyl group of 8 to 9 carbon atoms, A is an alkylene chain of 3 to 4 carbon atoms, n is an integer of 7 to 16, and m is an integer of 1 to 10.

The polyalkylene glycol condensates of U.S. Pat. No. 3,048,548 issued Aug. 7, 1962 to Martin et al. having alternating hydrophilic oxyethylene chains and hydrophobic oxypropylene chains where the weight of the terminal hydrophobic chains, the weight of the middle hydrophobic unit and the weight of the linking hydrophilic units each represent about one-third of the condensate.

The defoaming nonionic surfactants disclosed in U.S. Pat. No. 3,382,178 issued May 7, 1968 to Lissant et al. having the general formula $Z[(OR)_nOH]_z$ wherein Z is alkoxylatable material, R is a radical derived from an alkaline oxide which can be ethylene and propylene and n is an integer from, for example, 10 to 2,000 or more and z is an integer determined by the number of reactive oxyalkylatable groups.

The conjugated polyoxyalkylene compounds described in U.S. Pat. No. 2,677,700, issued May 4, 1954 to Jackson et al. corresponding to the formula $Y(C_3H_6O)_n(C_2H_4O)_mH$ wherein Y is the residue of organic compound having from about 1 to 6 carbon atoms and one reactive hydrogen atom, n has an average value of at least about 6.4, as determined by hydroxyl number and m has a value such that the oxyethylene portion constitutes about 10% to about 90% by weight of the molecule.

The conjugated polyoxyalkylene compounds described in U.S. Pat. No. 2,674,619, issued Apr. 6, 1954 to Lundsted et al. having the formula $Y[(C_3H_6O_n(C_2H_4O)_mH]_x$ wherein Y is the residue of an organic compound having from about 2 to 6 carbon atoms and containing x reactive hydrogen atoms in which x has a value of at least about 2, n has a value such that the molecular weight of the polyoxypropylene hydrophobic base is at least about 900 and m has value such that the oxyethylene content of the molecule is from about 10% to about 90% by weight. Compounds falling within the scope of the definition for Y include, for example, propylene glycol, glycerine, pentaerythritol, trimethylolpropane, ethylenediamine and the like. The oxypropylene chains optionally, but advantageously, contain small amounts of ethylene oxide and the oxyethylene chains also optionally, but advantageously, contain small amounts of propylene oxide.

Additional conjugated polyoxyalkylene surface-active agents which are advantageously used in the compositions of this invention correspond to the formula: $P[(C_3H_6O)_n(C_2H_4O)_mH]_x$ wherein P is the residue of an organic compound having from about 8 to 18 carbon atoms and containing x reactive hydrogen atoms in which x has a value of 1 or 2, n has a value such that the molecular weight of the polyoxyethylene portion is at least about 44 and m has a value such that the oxypropylene content of the molecule is from about 10% to about 90% by weight. In either case the oxypropylene chains may contain optionally, but advantageously, small amounts of ethylene oxide and the oxyethylene chains may contain also optionally, but advantageously, small amounts of propylene oxide.

8. Polyhydroxy fatty acid amide surfactants suitable for use in the present compositions include those having the structural formula $R_2CON_{R1}Z$ in which: R1 is H, $C_1$-$C_4$ hydrocarbyl, 2-hydroxy ethyl, 2-hydroxy propyl, ethoxy, propoxy group, or a mixture thereof; $R_2$ is a $C_5$-$C_{31}$ hydrocarbyl, which can be straight-chain; and Z is a polyhydroxyhydrocarbyl having a linear hydrocarbyl chain with at least 3 hydroxyls directly connected to the chain, or an alkoxylated derivative (preferably ethoxylated or propoxylated) thereof. Z can be derived from a reducing sugar in a reductive amination reaction; such as a glycityl moiety.

9. The alkyl ethoxylate condensation products of aliphatic alcohols with from about 0 to about 25 moles of ethylene oxide are suitable for use in the present compositions. The alkyl chain of the aliphatic alcohol can either be straight or branched, primary or secondary, and generally contains from 6 to 22 carbon atoms.

10. The ethoxylated $C_6$-$C_{18}$ fatty alcohols and $C_6$-$C_{18}$ mixed ethoxylated and propoxylated fatty alcohols are suitable surfactants for use in the present compositions, particularly those that are water soluble. Suitable ethoxylated fatty alcohols include the $C_6$-$C_{18}$ ethoxylated fatty alcohols with a degree of ethoxylation of from 3 to 50.

11. Suitable nonionic alkylpolysaccharide surfactants, particularly for use in the present compositions include those disclosed in U.S. Pat. No. 4,565,647, Llenado, issued Jan. 21, 1986. These surfactants include a hydrophobic group containing from about 6 to about 30 carbon atoms and a polysaccharide, e.g., a polyglycoside, hydrophilic group containing from about 1.3 to about 10 saccharide units. Any reducing saccharide containing 5 or 6 carbon atoms can be used, e.g., glucose, galactose and galactosyl moieties can be substituted for the glucosyl moieties. (Optionally the hydrophobic group is attached at the 2-, 3-, 4-, etc. positions thus giving a glucose or galactose as opposed to a glucoside or galactoside.) The intersaccharide bonds can be, e.g., between the one position of the additional saccharide units and the 2-, 3-, 4-, and/or 6-positions on the preceding saccharide units.

12. Fatty acid amide surfactants suitable for use the present compositions include those having the formula: $R_6CON(R_7)_2$ in which $R_6$ is an alkyl group containing from 7 to 21 carbon atoms and each $R_7$ is independently hydrogen, $C_1$-$C_4$ alkyl, $C_1$-$C_4$ hydroxyalkyl, or $-(C_2H_4O)_xH$, where x is in the range of from 1 to 3.

13. A useful class of non-ionic surfactants include the class defined as alkoxylated amines or, most particularly, alcohol alkoxylated/aminated/alkoxylated surfactants. These non-ionic surfactants may be at least in part represented by the general formulae: $R^{20}-(PO)_sN-(EO)_tH$, $R^{20}-(PO)_sN-(EO)_tH(EO)_tH$, and $R^{20}-N(EO)_tH$; in which $R^{20}$ is an alkyl, alkenyl or other aliphatic group, or an alkyl-aryl group of from 8 to 20, preferably 12 to 14 carbon atoms, EO is oxyethylene, PO is oxypropylene, s is 1 to 20, preferably 2-5, t is 1-10, preferably 2-5, and u is 1-10, preferably 2-5. Other variations on the scope of these compounds may be represented by the alternative formula: $R^{20}-(PO)v-N[(EO)_wH][(EO)_zH]$ in which $R^{20}$ is as defined above, v is 1 to 20 (e.g., 1, 2, 3, or 4 (preferably 2)), and w and z are independently 1-10, preferably 2-5. These compounds are represented commercially by a line of products sold by Huntsman Chemicals as nonionic surfactants. A preferred chemical of this class includes Surfonic® PEA 25 Amine Alkoxylate. Preferred nonionic surfactants for the compositions of the invention include alcohol alkoxylates, EO/PO block copolymers, alkylphenol alkoxylates, and the like.

The treatise *Nonionic Surfactants*, edited by Schick, M. J., Vol. 1 of the Surfactant Science Series, Marcel Dekker, Inc., New York, 1983 is an excellent reference on the wide variety of nonionic compounds generally employed in the practice of the present invention. A typical listing of nonionic classes, and species of these surfactants, is given in U.S. Pat. No. 3,929,678 issued to Laughlin and Heuring on Dec. 30, 1975. Further examples are given in "Surface Active Agents and detergents" (Vol. I and II by Schwartz, Perry and Berch).

Semi-Polar Nonionic Surfactants

The semi-polar type of nonionic surface active agents are another class of nonionic surfactant useful in compositions of the present invention. Generally, semi-polar nonionics are high foamers and foam stabilizers, which can limit their application in CIP systems. However, within compositional embodiments of this invention designed for high foam cleaning methodology, semi-polar nonionics would have immediate utility. The semi-polar nonionic surfactants include the amine oxides, phosphine oxides, sulfoxides and their alkoxylated derivatives.

14. Amine oxides are tertiary amine oxides corresponding to the general formula:

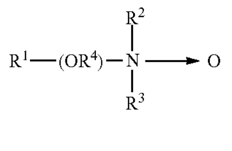

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkaline or a hydroxyalkylene group containing 2 to 3 carbon atoms; and n ranges from 0 to about 20.

Useful water soluble amine oxide surfactants are selected from the coconut or tallow alkyl di-(lower alkyl) amine oxides, specific examples of which are dodecyl dim ethyl amine oxide, tridecyldimethylamine oxide, etradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl)amine oxide, 3,6,9-trioctadecyldimethylamine oxide and 3-dodecoxy-2-hydroxypropyldi-(2-hydroxyethyl)amine oxide.

Useful semi-polar nonionic surfactants also include the water soluble phosphine oxides having the following structure:

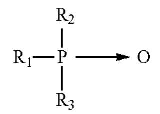

wherein the arrow is a conventional representation of a semi-polar bond; and, R' is an alkyl, alkenyl or hydroxyalkyl moiety ranging from 10 to about 24 carbon atoms in chain length; and, $R^2$ and $R^3$ are each alkyl moieties separately selected from alkyl or hydroxyalkyl groups containing 1 to 3 carbon atoms.

Examples of useful phosphine oxides include dimethyldecylphosphine oxide, dimethyltetradecylphosphine oxide, methylethyltetradecylphosphone oxide, dimethylhexadecylphosphine oxide, diethyl-2-hydroxyoctyldecylphosphine oxide, bis(2-hydroxyethyl)dodecylphosphine oxide, and bis(hydroxymethyl)tetradecylphosphine oxide.

Semi-polar nonionic surfactants useful herein also include the water soluble sulfoxide compounds which have the structure:

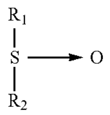

wherein the arrow is a conventional representation of a semi-polar bond; and, $R^1$ is an alkyl or hydroxyalkyl moiety of about 8 to about 28 carbon atoms, from 0 to about 5 ether linkages and from 0 to about 2 hydroxyl substituents; and $R^2$ is an alkyl moiety consisting of alkyl and hydroxyalkyl groups having 1 to 3 carbon atoms.

Useful examples of these sulfoxides include dodecyl methyl sulfoxide; 3-hydroxy tridecyl methyl sulfoxide; 3-methoxy tridecyl methyl sulfoxide; and 3-hydroxy-4-dodecoxybutyl methyl sulfoxide.

Semi-polar nonionic surfactants for the compositions of the invention include dimethyl amine oxides, such as lauryl dimethyl amine oxide, myristyl dimethyl amine oxide, cetyl dimethyl amine oxide, combinations thereof, and the like. Useful water soluble amine oxide surfactants are selected from the octyl, decyl, dodecyl, isododecyl, coconut, or tallow alkyl di-(lower alkyl) amine oxides, specific examples of which are octyldimethylamine oxide, nonyldimethylamine oxide, decyldimethylamine oxide, undecyldimethylamine oxide, dodecyldimethylamine oxide, iso-dodecyldimethylamine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl) amine oxide, 3,6,9-trioctadecyldimethylamine oxide and 3-dodecoxy-2-hydroxypropyldi-(2-hydroxyethyl)amine oxide.

Suitable nonionic surfactants suitable for use with the compositions of the present invention include alkoxylated surfactants. Suitable alkoxylated surfactants include EO/PO copolymers, capped EO/PO copolymers, alcohol alkoxylates, capped alcohol alkoxylates, mixtures thereof, or the like. Suitable alkoxylated surfactants for use as solvents include EO/PO block copolymers, such as the Pluronic® and reverse Pluronic® surfactants; alcohol alkoxylates, such as Dehypon® LS-54 ($R-(EO)_5(PO)_4$) and Dehypon® LS-36 ($R-(EO)_3(PO)_6$); and capped alcohol alkoxylates, such as Plurafac® LF221 and Tegoten® EC11; mixtures thereof, or the like.

Anionic Surfactants

Also useful in the present invention are surface active substances which are categorized as anionics because the charge on the hydrophobe is negative; or surfactants in which the hydrophobic section of the molecule carries no charge unless the pH is elevated to neutrality or above (e.g. carboxylic acids). Carboxylate, sulfonate, sulfate and phosphate are the polar (hydrophilic) solubilizing groups found in anionic surfactants. Of the cations (counter ions) associated with these polar groups, sodium, lithium and potassium impart water solubility; ammonium and substituted ammonium ions provide both water and oil solubility; and, calcium, barium, and magnesium promote oil solubility. As those skilled in the art understand, anionics are excellent detersive surfactants and are therefore favored additions to heavy duty detergent compositions.

Anionic sulfate surfactants suitable for use in the present compositions include alkyl ether sulfates, alkyl sulfates, the linear and branched primary and secondary alkyl sulfates, alkyl ethoxysulfates, fatty oleyl glycerol sulfates, alkyl phenol ethylene oxide ether sulfates, the $C_5$-$C_{17}$ acyl-N—($C_1$-$C_4$ alkyl) and —N—($C_1$-$C_2$ hydroxyalkyl) glucamine sulfates, and sulfates of alkylpolysaccharides such as the sulfates of alkylpolyglucoside, and the like. Also included are the alkyl sulfates, alkyl poly(ethyleneoxy) ether sulfates and aromatic poly(ethyleneoxy) sulfates such as the sulfates or condensation products of ethylene oxide and nonyl phenol (usually having 1 to 6 oxyethylene groups per molecule).

Anionic sulfonate surfactants suitable for use in the present compositions also include alkyl sulfonates, the linear and branched primary and secondary alkyl sulfonates, and the aromatic sulfonates with or without substituents.

Anionic carboxylate surfactants suitable for use in the present compositions include carboxylic acids (and salts), such as alkanoic acids (and alkanoates), ester carboxylic acids (e.g. alkyl succinates), ether carboxylic acids, sulfonated fatty acids, such as sulfonated oleic acid, and the like. Such carboxylates include alkyl ethoxy carboxylates, alkyl aryl ethoxy carboxylates, alkyl polyethoxy polycarboxylate surfactants and soaps (e.g. alkyl carboxyls). Secondary carboxylates useful in the present compositions include those which contain a carboxyl unit connected to a secondary carbon. The secondary carbon can be in a ring structure, e.g. as in p-octyl benzoic acid, or as in alkyl-substituted cyclohexyl carboxylates. The secondary carboxylate surfactants typically contain no ether linkages, no ester linkages and no hydroxyl groups. Further, they typically lack nitrogen atoms in the head-group (amphiphilic portion). Suitable secondary soap surfactants typically contain 11-13 total carbon atoms, although more carbons atoms (e.g., up to 16) can be present. Suitable carboxylates also include acylamino acids (and salts), such as acylgluamates, acyl peptides, sarcosinates (e.g. N-acyl sarcosinates), taurates (e.g. N-acyl taurates and fatty acid amides of methyl tauride), and the like.

Suitable anionic surfactants include alkyl or alkylaryl ethoxy carboxylates of the following formula:

$$R—O—(CH_2CH_2O)_n(CH_2)_m—CO_2X \quad (3)$$

in which R is a $C_8$ to $C_{22}$ alkyl group or

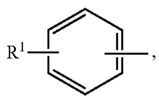

in which $R^1$ is a $C_4$-$C_{16}$ alkyl group; n is an integer of 1-20; m is an integer of 1-3; and X is a counter ion, such as hydrogen, sodium, potassium, lithium, ammonium, or an amine salt such as monoethanolamine, diethanolamine or triethanolamine. In some embodiments, n is an integer of 4 to 10 and m is 1. In some embodiments, R is a $C_8$-$C_{16}$ alkyl group. In some embodiments, R is a $C_{12}$-$C_{14}$ alkyl group, n is 4, and m is 1.

In other embodiments, R is

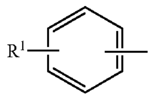

and $R^1$ is a $C_6$-$C_{12}$ alkyl group. In still yet other embodiments, $R^1$ is a $C_9$ alkyl group, n is 10 and m is 1.

Such alkyl and alkylaryl ethoxy carboxylates are commercially available. These ethoxy carboxylates are typically available as the acid forms, which can be readily converted to the anionic or salt form. Commercially available carboxylates include, Neodox 23-4, a $C_{12-13}$ alkyl polyethoxy (4) carboxylic acid (Shell Chemical), and Emcol CNP-110, a $C_9$ alkylaryl polyethoxy (10) carboxylic acid (AkzoNobel). Carboxylates are also available from Clariant, e.g. the product Sandopan® DTC, a $C_{13}$ alkyl polyethoxy (7) carboxylic acid.

Cationic Surfactants

Surface active substances are classified as cationic if the charge on the hydrotrope portion of the molecule is positive. Surfactants in which the hydrotrope carries no charge unless the pH is lowered close to neutrality or lower, but which are then cationic (e.g. alkyl amines), are also included in this group. In theory, cationic surfactants may be synthesized from any combination of elements containing an "onium" structure RnX+Y— and could include compounds other than nitrogen (ammonium) such as phosphorus (phosphonium) and sulfur (sulfonium). In practice, the cationic surfactant field is dominated by nitrogen containing compounds, probably because synthetic routes to nitrogenous cationics are simple and straightforward and give high yields of product, which can make them less expensive.

Cationic surfactants preferably include, more preferably refer to, compounds containing at least one long carbon chain hydrophobic group and at least one positively charged nitrogen. The long carbon chain group may be attached directly to the nitrogen atom by simple substitution; or more preferably indirectly by a bridging functional group or groups in so-called interrupted alkylamines and amido amines. Such functional groups can make the molecule more hydrophilic and/or more water dispersible, more easily water solubilized by co-surfactant mixtures, and/or water soluble. For increased water solubility, additional primary, secondary or tertiary amino groups can be introduced or the amino nitrogen can be quaternized with low molecular weight alkyl groups. Further, the nitrogen can be a part of branched or straight chain moiety of varying degrees of unsaturation or of a saturated or unsaturated heterocyclic ring. In addition, cationic surfactants may contain complex linkages having more than one cationic nitrogen atom.

The surfactant compounds classified as amine oxides, amphoterics and zwitterions are themselves typically cationic in near neutral to acidic pH solutions and can overlap surfactant classifications. Polyoxyethylated cationic surfactants generally behave like nonionic surfactants in alkaline solution and like cationic surfactants in acidic solution.

The simplest cationic amines, amine salts and quaternary ammonium compounds can be schematically drawn thus:

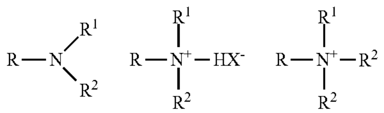

in which, R represents an alkyl chain, R', R", and R'" may be either alkyl chains or aryl groups or hydrogen and X represents an anion. The amine salts and quaternary ammonium compounds are preferred for practical use in this invention due to their high degree of water solubility.

The majority of large volume commercial cationic surfactants can be subdivided into four major classes and additional sub-groups known to those or skill in the art and described in "Surfactant Encyclopedia", *Cosmetics & Toiletries*, Vol. 104 (2) 86-96 (1989). The first class includes alkylamines and their salts. The second class includes alkyl imidazolines. The third class includes ethoxylated amines. The fourth class includes quaternaries, such as alkylbenzyldimethylammonium salts, alkyl benzene salts, heterocyclic ammonium salts, tetra alkylammonium salts, and the like. Cationic surfactants are known to have a variety of properties that can be beneficial in the present compositions. These desirable properties can include detergency in compositions of or below neutral pH, antimicrobial efficacy, thickening or gelling in cooperation with other agents, and the like.

Cationic surfactants useful in the compositions of the present invention include those having the formula $R^1_mR^2_xY_LZ$ wherein each $R^1$ is an organic group containing a straight or branched alkyl or alkenyl group optionally substituted with up to three phenyl or hydroxy groups and optionally interrupted by up to four of the following structures:

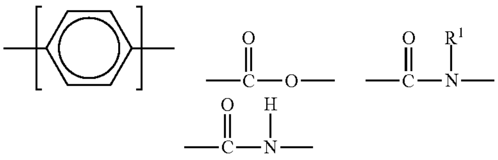

or an isomer or mixture of these structures, and which contains from about 8 to 22 carbon atoms. The $R^1$ groups can additionally contain up to 12 ethoxy groups. m is a number from 1 to 3. Preferably, no more than one $R^1$ group in a molecule has 16 or more carbon atoms when m is 2 or more than 12 carbon atoms when m is 3. Each $R^2$ is an alkyl or hydroxyalkyl group containing from 1 to 4 carbon atoms or a benzyl group with no more than one $R^2$ in a molecule being benzyl, and x is a number from 0 to 11, preferably from 0 to 6. The remainder of any carbon atom positions on the Y group are filled by hydrogens. Y is can be a group including, but not limited to:

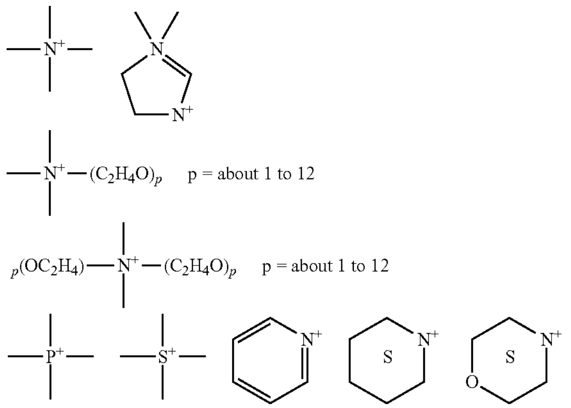

p = about 1 to 12 p = about 1 to 12 or a mixture thereof. Preferably, L is 1 or 2, with the Y groups being separated by a moiety selected from $R^1$ and $R^2$ analogs (preferably alkylene or alkenylene) having from 1 to about 22 carbon atoms and two free carbon single bonds when L is 2. Z is a water soluble anion, such as a halide, sulfate, methylsulfate, hydroxide, or nitrate anion, particularly preferred being chloride, bromide, iodide, sulfate or methyl sulfate anions, in a number to give electrical neutrality of the cationic component.

Amphoteric Surfactants

Amphoteric, or ampholytic, surfactants contain both a basic and an acidic hydrophilic group and an organic hydrophobic group. These ionic entities may be any of anionic or cationic groups described herein for other types of surfactants. A basic nitrogen and an acidic carboxylate group are the typical functional groups employed as the basic and acidic hydrophilic groups. In a few surfactants, sulfonate, sulfate, phosphonate or phosphate provide the negative charge.

Amphoteric surfactants can be broadly described as derivatives of aliphatic secondary and tertiary amines, in which the aliphatic radical may be straight chain or branched and wherein one of the aliphatic substituents contains from about 8 to 18 carbon atoms and one contains an anionic water solubilizing group, e.g., carboxy, sulfo, sulfato, phosphato, or phosphono. Amphoteric surfactants are subdivided into two major classes known to those of skill in the art and described in "Surfactant Encyclopedia" *Cosmetics & Toiletries*, Vol. 104 (2) 69-71 (1989), which is herein incorporated by reference in its entirety. The first class includes acyl/dialkyl ethylenediamine derivatives (e.g. 2-alkyl hydroxyethyl imidazoline derivatives) and their salts. The second class includes N-alkylamino acids and their salts. Some amphoteric surfactants can be envisioned as fitting into both classes.

Amphoteric surfactants can be synthesized by methods known to those of skill in the art. For example, 2-alkyl hydroxyethyl imidazoline is synthesized by condensation and ring closure of a long chain carboxylic acid (or a derivative) with dialkyl ethylenediamine. Commercial amphoteric surfactants are derivatized by subsequent hydrolysis and ring-opening of the imidazoline ring by alkylation—for example with chloroacetic acid or ethyl acetate. During alkylation, one or two carboxy-alkyl groups react to form a tertiary amine and an ether linkage with differing alkylating agents yielding different tertiary amines.

Long chain imidazole derivatives having application in the present invention generally have the general formula:

$CH_2COO^-$ $RCONHCH_2CH_2N^+H$ $CH_2CH_2OH$ (MONO)ACETATE $CH_2COO^-$ $RCONHCH_2CH_2N^+CH_2CH_2COOH$ $CH_2CH_2OH$ (DI)PROPIONATE

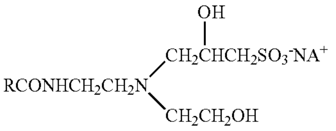

Neutral pH Zwitternion
AMPHOTERIC SULFONATE wherein R is an acyclic hydrophobic group containing from about 8 to 18 carbon atoms and M is a cation to neutralize the charge of the anion, generally sodium. Commercially prominent imidazoline-derived amphoterics that can be employed in the present compositions include for example: Cocoamphopropionate, Cocoamphocarboxy-propionate, Cocoamphoglycinate, Cocoamphocarboxy-glycinate, Cocoamphopropyl-sulfonate, and Cocoamphocarboxy-propionic acid. Amphocarboxylic acids can be produced from fatty imidazolines in which the dicarboxylic acid functionality of the amphodicarboxylic acid is diacetic acid and/or dipropionic acid.

The carboxymethylated compounds (glycinates) described herein above frequently are called betaines. Betaines are a special class of amphoteric discussed herein below in the section entitled, Zwitterion Surfactants.

Long chain N-alkylamino acids are readily prepared by reaction $RNH_2$, in which $R{=}C_8$-$C_{18}$ straight or branched chain alkyl, fatty amines with halogenated carboxylic acids. Alkylation of the primary amino groups of an amino acid leads to secondary and tertiary amines. Alkyl substituents may have additional amino groups that provide more than one reactive nitrogen center. Most commercial N-alkylamine acids are alkyl derivatives of beta-alanine or beta-N(2-carboxyethyl) alanine. Examples of commercial N-alkylamino acid ampholytes having application in this invention include alkyl beta-amino dipropionates, $RN(C_2H_4COOM)_2$ and $RNHC_2H_4COOM$. In an embodiment, R can be an acyclic hydrophobic group containing from about 8 to about 18 carbon atoms, and M is a cation to neutralize the charge of the anion.

Suitable amphoteric surfactants include those derived from coconut products such as coconut oil or coconut fatty acid. Additional suitable coconut derived surfactants include as part of their structure an ethylenediamine moiety, an alkanolamide moiety, an amino acid moiety, e.g., glycine, or a combination thereof; and an aliphatic substituent of from about 8 to 18 (e.g., 12) carbon atoms. Such a surfactant can also be considered an alkyl amphodicarboxylic acid. These amphoteric surfactants can include chemical structures represented as: $C_{12}$-alkyl-C(O)—NH—$CH_2$—$CH_2$—$N^+$($CH_2$—$CH_2$—$CO_2Na)_2$—$CH_2$—$CH_2$—OH or C12-alkyl-C(O)—N(H)—$CH_2$—$CH_2$—$N^+$($CH_2$—$CO_2Na)_2$—$CH_2$—$CH_2$—OH. Disodium cocoampho dipropionate is one suitable amphoteric surfactant and is commercially available under the tradename Miranol® FBS from Rhodia Inc., Cranbury, N.J. Another suitable coconut derived amphoteric surfactant with the chemical name disodium cocoampho diacetate is sold under the tradename Mirataine® JCHA, also from Rhodia Inc., Cranbury, N.J.

A typical listing of amphoteric classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated by reference in their entirety.

Zwitterionic Surfactants

Zwitterionic surfactants can be thought of as a subset of the amphoteric surfactants and can include an anionic charge. Zwitterionic surfactants can be broadly described as derivatives of secondary and tertiary amines, derivatives of heterocyclic secondary and tertiary amines, or derivatives of quaternary ammonium, quaternary phosphonium or tertiary sulfonium compounds. Typically, a zwitterionic surfactant includes a positive charged quaternary ammonium or, in some cases, a sulfonium or phosphonium ion; a negative charged carboxyl group; and an alkyl group. Zwitterionics generally contain cationic and anionic groups which ionize to a nearly equal degree in the isoelectric region of the molecule and which can develop strong "inner-salt" attraction between positive-negative charge centers. Examples of such zwitterionic synthetic surfactants include derivatives of aliphatic quaternary ammonium, phosphonium, and sulfonium compounds, in which the aliphatic radicals can be straight chain or branched, and wherein one of the aliphatic substituents contains from 8 to 18 carbon atoms and one contains an anionic water solubilizing group, e.g., carboxy, sulfonate, sulfate, phosphate, or phosphonate.

Betaine and sultaine surfactants are exemplary zwitterionic surfactants for use herein. A general formula for these compounds is:

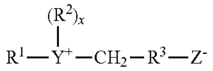

wherein $R^1$ contains an alkyl, alkenyl, or hydroxyalkyl radical of from 8 to 18 carbon atoms having from 0 to 10 ethylene oxide moieties and from 0 to 1 glyceryl moiety; Y is selected from the group consisting of nitrogen, phosphorus, and sulfur atoms; $R^2$ is an alkyl or monohydroxy alkyl group containing 1 to 3 carbon atoms; x is 1 when Y is a sulfur atom and 2 when Y is a nitrogen or phosphorus atom, $R^3$ is an alkylene or hydroxy alkylene or hydroxy alkylene of from 1 to 4 carbon atoms and Z is a radical selected from the group consisting of carboxylate, sulfonate, sulfate, phosphonate, and phosphate groups.

Examples of zwitterionic surfactants having the structures listed above include: 4-[N,N-di(2-hydroxyethyl)-N-octadecylammonio]-butane-1-carboxylate; 5-[S-3-hydroxypropyl-S-hexadecylsulfonio]-3-hydroxypentane-1-sulfate; 3-[P,P-diethyl-P-3,6,9-trioxatetracosanephosphonio]-2-hydroxypropane-1-phosphate; 3-[N,N-dipropyl-N-3-dodecoxy-2-hydroxypropyl-ammonio]-propane-1-phosphonate; 3-(N,N-dimethyl-N-hexadecylammonio)-propane-1-sulfonate; 3-(N,N-dimethyl-N-hexadecylammonio)-2-hydroxy-propane-1-sulfonate; 4-[N,N-di(2(2-hydroxyethyl)-N(2-hydroxydodecyl)ammonio]-butane-1-carboxylate; 3-[S-ethyl-S-(3-dodecoxy-2-hydroxypropyl)sulfonio]-propane-1-phosphate; 3-[P,P-dimethyl-P-dodecylphosphonio]-propane-1-phosphonate; and S[N,N-di(3-hydroxypropyl)-N-hexadecylammonio]-2-hydroxy-pentane-1-sulfate. The alkyl groups contained in said detergent surfactants can be straight or branched and saturated or unsaturated.

The zwitterionic surfactant suitable for use in the present compositions includes a betaine of the general structure:

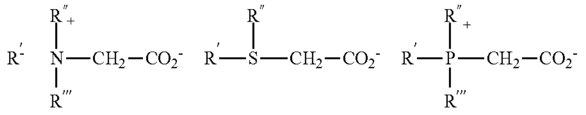

These surfactant betaines typically do not exhibit strong cationic or anionic characters at pH extremes nor do they show reduced water solubility in their isoelectric range. Unlike "external" quaternary ammonium salts, betaines are compatible with anionics. Examples of suitable betaines include coconut acylamidopropyldimethyl betaine; hexadecyl dimethyl betaine; $C_{12-14}$ acylamidopropylbetaine; $C_{8-14}$ acylamidohexyldiethyl betaine; 4-$C_{14-16}$ acylmethylamidodiethylammonio-1-carboxybutane; $C_{16-18}$ acylamidodimethylbetaine; $C_{12-16}$ acylamidopentanediethylbetaine; and $C_{12-16}$ acylmethylamidodimethylbetaine.

Sultaines useful in the present invention include those compounds having the formula $(R(R^1)_2N^+R^2SO^{3-}$, in which R is a $C_6$-$C_{18}$ hydrocarbyl group, each $R^1$ is typically independently $C_1$-$C_3$ alkyl, e.g. methyl, and $R^2$ is a $C_1$-$C_6$ hydrocarbyl group, e.g. a $C_1$-$C_3$ alkylene or hydroxyalkylene group.

A typical listing of zwitterionic classes, and species of these surfactants, is given in U.S. Pat. No. 3,929,678 issued to Laughlin and Heuring on Dec. 30, 1975. Further examples are given in "Surface Active Agents and Detergents" (Vol. I and II by Schwartz, Perry and Berch). Each of these references are herein incorporated in their entirety.

Additional Enzyme Stabilizers

One skilled in the art will ascertain suitable enzyme stabilizers and/or stabilizing systems for enzyme compositions suitable for use according to the invention, such as those described, for example, in U.S. Pat. Nos. 7,569,532 and 6,638,902, which are incorporated herein in their entirety. According to an embodiment of the invention, an enzyme stabilizing system may include a mixture of carbonate and bicarbonate and can also include other ingredients to stabilize certain enzymes or to enhance or maintain the effect of the mixture of carbonate and bicarbonate. An enzyme stabilizer may further include boron compounds or calcium salts. For example, enzyme stabilizers may be boron compounds selected from the group consisting of boronic acid, boric acid, borate, polyborate and combinations thereof.

Enzyme stabilizers may also include chlorine bleach scavengers added to prevent chlorine bleach species present from attacking and inactivating the enzymes especially under alkaline conditions. Therefore, suitable chlorine scavenger anions may be added as an enzyme stabilizer to prevent the deactivation of the enzyme compositions according to the invention. Exemplary chlorine scavenger anions include salts containing ammonium cations with sulfite, bisulfite, thiosulfite, thiosulfate, iodide, etc. Antioxidants such as carbamate, ascorbate, etc., organic amines such as ethylenediaminetetracetic acid (EDTA) or alkali metal salt thereof, monoethanolamine (MEA), and mixtures thereof can also be used.

Rinse Aids

The cleaning compositions can optionally include a rinse aid composition, for example a rinse aid formulation containing a wetting or sheeting agent combined with other optional ingredients in a solid composition. The rinse aid components are capable of reducing the surface tension of the rinse water to promote sheeting action and/or to prevent spotting or streaking caused by beaded water after rinsing is complete, for example in warewashing processes. Examples of sheeting agents include, but are not limited to: polyether compounds prepared from ethylene oxide, propylene oxide, or a mixture in a homopolymer or block or heteric copolymer structure. Such polyether compounds are known as polyalkylene oxide polymers, polyoxyalkylene polymers or polyalkylene glycol polymers. Such sheeting agents require a region of relative hydrophobicity and a region of relative hydrophilicity to provide surfactant properties to the molecule. When a rinse aid composition is used, it can be present at about 1 to about 5 milliliters per cycle, wherein one cycle includes about 6.5 liters of water.

Thickening Agents

Thickeners useful in the present invention include those compatible with alkaline systems. The viscosity of the cleaning composition increases with the amount of thickening agent, and viscous compositions are useful for uses where the cleaning composition clings to the surface. Suitable thickeners can include those which do not leave contaminating residue on the surface to be treated. Generally, thickeners which may be used in the present invention include natural gums such as xanthan gum, guar gum, modified guar, or other gums from plant mucilage; polysaccharide based thickeners, such as alginates, starches, and cellulosic polymers (e.g., carboxymethyl cellulose, hydroxyethyl cellulose, and the like); polyacrylates thickeners; and hydrocolloid thickeners, such as pectin. Generally, the concentration of thickener employed in the present compositions or methods will be dictated by the desired viscosity within the final composition. However, as a general guideline, if present, the viscosity of thickener within the present composition ranges from about 0.1 wt % to about 3 wt %, from about 0.1 wt % to about 2 wt %, or about 0.1 wt % to about 0.5 wt %.

Dyes and Fragrances

Various dyes, odorants including perfumes, and other aesthetic enhancing agents may also be included in the cleaning composition. Dyes may be included to alter the appearance of the composition, as for example, any of a variety of FD&C dyes, D&C dyes, and the like. Additional suitable dyes include Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keystone Aniline and Chemical), Metanil Yellow (Keystone Aniline and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), Acid Green 25 (Ciba-Geigy), Pylakor Acid Bright Red (Pylam), and the like. Fragrances or perfumes that may be included in the compositions include, for example, terpenoids such as citronellol, aldehydes such as amyl cinnamaldehyde, a jasmine such as C1S-jasmine or jasmal, vanillin, and the like.

Bleaching Agents

The cleaning composition can optionally include a bleaching agent for lightening or whitening a substrate, and can include bleaching compounds capable of liberating an active halogen species, such as $Cl_2$, $Br_2$, —OCl— and/or —OBr—, or the like, under conditions typically encountered during the cleansing process. Examples of suitable bleaching agents include, but are not limited to: chlorine-containing compounds such as chlorine, a hypochlorite or chloramines; however in aspects of the invention chlorine-containing compounds are not employed due to compatibility with enzymes. Examples of suitable halogen-releasing compounds include, but are not limited to: alkali metal dichloroisocyanurates, alkali metal hypochlorites, monochloramine, and dichloroamine. Encapsulated chlorine sources may also be used to enhance the stability of the chlorine source in the composition (see, for example, U.S. Pat. Nos. 4,618,914 and 4,830,773, the disclosures of which are incorporated by reference herein). The bleaching agent may also include an agent containing or acting as a source of active oxygen. The active oxygen compound acts to provide a source of active oxygen and may release active oxygen in aqueous solutions. An active oxygen compound can be inorganic, organic or a mixture thereof. Examples of suitable active oxygen compounds include, but are not limited to: peroxygen compounds, peroxygen compound adducts, hydrogen peroxide, perborates, sodium carbonate peroxyhydrate, phosphate peroxyhydrates, potassium permonosulfate, and sodium perborate mono and tetrahydrate, with and without activators such as tetraacetylethylene diamine.

Sanitizers/Anti-Microbial Agents

The cleaning composition can optionally include a sanitizing agent (or antimicrobial agent). Sanitizing agents, also known as antimicrobial agents, are chemical compositions that can be used to prevent microbial contamination and deterioration of material systems, surfaces, etc. Generally, these materials fall in specific classes including phenolics, halogen compounds, quaternary ammonium compounds, metal derivatives, amines, alkanol amines, nitro derivatives, anilides, organosulfur and sulfur-nitrogen compounds and miscellaneous compounds.

The given antimicrobial agent, depending on chemical composition and concentration, may simply limit further proliferation of numbers of the microbe or may destroy all or a portion of the microbial population. The terms "microbes" and "microorganisms" typically refer primarily to bacteria, virus, yeast, spores, and fungus microorganisms. In use, the antimicrobial agents are typically formed into a solid functional material that when diluted and dispensed, optionally, for example, using an aqueous stream forms an aqueous disinfectant or sanitizer composition that can be contacted with a variety of surfaces resulting in prevention of growth or the killing of a portion of the microbial population. A three log reduction of the microbial population results in a sanitizer composition. The antimicrobial agent can be encapsulated, for example, to improve its stability.

Examples of suitable antimicrobial agents include, but are not limited to, phenolic antimicrobials such as pentachlorophenol; orthophenylphenol; chloro-p-benzylphenols; p-chloro-m-xylenol; quaternary ammonium compounds such as alkyl dimethylbenzyl ammonium chloride; alkyl dimethylethylbenzyl ammonium chloride; octyl decyldimethyl ammonium chloride; dioctyl dimethyl ammonium chloride; and didecyl dimethyl ammonium chloride. Examples of suitable halogen containing antibacterial agents include, but are not limited to: sodium trichloroisocyanurate, sodium dichloro isocyanate (anhydrous or dihydrate), iodine-poly(vinylpyrolidinone) complexes, bromine compounds such as 2-bromo-2-nitropropane-1,3-diol, and quaternary antimicrobial agents such as benzalkonium chloride, didecyldimethyl ammonium chloride, choline diiodochloride, and tetramethyl phosphonium tribromide. Other antimicrobial compositions such as hexahydro-1,3,5-tris(2-hydroxyethyl)-s-triazine, dithiocarbamates such as sodium dimethyldithiocarbamate, and a variety of other materials are known in the art for their antimicrobial properties.

It should also be understood that active oxygen compounds, such as those discussed above in the bleaching agents section, may also act as antimicrobial agents, and can even provide sanitizing activity. In fact, in some embodiments, the ability of the active oxygen compound to act as an antimicrobial agent reduces the need for additional antimicrobial agents within the composition. For example, percarbonate compositions have been demonstrated to provide excellent antimicrobial action.

Activators

In some embodiments, the antimicrobial activity or bleaching activity of the cleaning composition can be enhanced by the addition of a material which, when the cleaning composition is placed in use, reacts with the active oxygen to form an activated component. For example, in some embodiments, a peracid or a peracid salt is formed. For example, in some embodiments, tetraacetylethylene diamine can be included within the detergent composition to react with the active oxygen and form a peracid or a peracid salt that acts as an antimicrobial agent. Other examples of active oxygen activators include transition metals and their compounds, compounds that contain a carboxylic, nitrile, or ester moiety, or other such compounds known in the art. In an embodiment, the activator includes tetraacetylethylene diamine; transition metal; compound that includes carboxylic, nitrile, amine, or ester moiety; or mixtures thereof. In some embodiments, an activator for an active oxygen compound combines with the active oxygen to form an antimicrobial agent.

In some embodiments, the cleaning composition is in the form of a solid block, and an activator material for the active oxygen is coupled to the solid block. The activator can be coupled to the solid block by any of a variety of methods for coupling one solid detergent composition to another. For example, the activator can be in the form of a solid that is bound, affixed, glued or otherwise adhered to the solid block. Alternatively, the solid activator can be formed around and encasing the block. By way of further example, the solid activator can be coupled to the solid block by the container or package for the detergent composition, such as by a plastic or shrink wrap or film.

Builders or Fillers

The cleaning composition can optionally include a minor but effective amount of one or more of a filler which does not necessarily perform as a cleaning agent per se, but may cooperate with a cleaning agent to enhance the overall cleaning capacity of the composition. Examples of suitable fillers include, but are not limited to: sodium sulfate, sodium chloride, starch, sugars, and C1-C10 alkylene glycols such as propylene glycol.

Defoaming Agents

The cleaning composition can optionally include a minor but effective amount of a defoaming agent for reducing the stability of foam. Examples of suitable defoaming agents include, but are not limited to: silicone compounds such as silica dispersed in polydimethylsiloxane, fatty amides, hydrocarbon waxes, fatty acids, fatty esters, fatty alcohols, fatty acid soaps, ethoxylates, mineral oils, polyethylene glycol esters, and alkyl phosphate esters such as monostearyl phosphate. A discussion of defoaming agents may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated by reference herein.

Anti-Redeposition Agents

The cleaning composition can optionally include an additional anti-redeposition agent capable of facilitating sustained suspension of soils in a cleaning solution and preventing the removed soils from being redeposited onto the substrate being cleaned. Examples of suitable anti-redeposition agents include, but are not limited to: fatty acid amides, fluorocarbon surfactants, complex phosphate esters, polyacrylates, styrene maleic anhydride copolymers, and cellulosic derivatives such as hydroxyethyl cellulose, hydroxypropyl cellulose.

Additional Stabilizing Agents

The cleaning composition may also include further stabilizing agents. Examples of suitable stabilizing agents include, but are not limited to: borate, calcium/magnesium ions, propylene glycol, and mixtures thereof Dispersants The cleaning composition may also include dispersants. Examples of suitable dispersants that can be used in the solid detergent composition include, but are not limited to: maleic acid/olefin copolymers, polyacrylic acid, and mixtures thereof.

Hardening Agents/Solubility Modifiers

The cleaning composition may include a minor but effective amount of a hardening agent. Examples of suitable hardening agents include, but are not limited to: an amide such stearic monoethanolamide or lauric diethanolamide, an alkylamide, a solid polyethylene glycol, a solid EO/PO block copolymer, starches that have been made water-soluble through an acid or alkaline treatment process, and various inorganics that impart solidifying properties to a heated composition upon cooling. Such compounds may also vary the solubility of the composition in an aqueous medium during use such that the cleaning agent and/or other active ingredients may be dispensed from the solid composition over an extended period of time.

Adjuvants

The present composition can also include any number of adjuvants. Specifically, the cleaning composition can include stabilizing agents, wetting agents, foaming agents, corrosion inhibitors, biocides and hydrogen peroxide among any number of other constituents which can be added to the composition. Such adjuvants can be pre-formulated with the present composition or added to the system simultaneously, or even after, the addition of the present composition. The cleaning composition can also contain any number of other constituents as necessitated by the application, which are known and which can facilitate the activity of the present compositions.

Methods of Use

The cleaning compositions can be used in various industries, including, but not limited to: warewash (institutional and consumer), food and beverage, health and textile care for cleaning substrates and providing numerous beneficial results, including enhancing detergency of a carbonate alkaline detergent composition containing stabilized enzymes (and/or a stabilized use solution), wherein the detergent composition is more effective in removing soils, preventing redeposition of the soils, and maintains low-foaming of the wash water. In particular, the cleaning compositions can be safely used to clean a variety of surfaces, including for example on ceramics, ceramic tile, grout, granite, concrete, mirrors, enameled surfaces, metals including aluminum, brass, stainless steel, glass, plastic and the like. Compositions of the invention may also be used to clean soiled linens such as towels, sheets, and nonwoven webs. As such, compositions of the invention are useful to formulate hard surface cleaners, laundry detergents, oven cleaners, hand soaps, automotive detergents, and warewashing detergents whether automatic or manual. In preferred aspects of the invention, the cleaning compositions and methods of use are particularly suited for warewash applications.

The compositions according to the invention can be provided as a solid, liquid, or gel, or a combination thereof. As set forth in the description of the compositions, the cleaning compositions can be provided in one or more parts, such as the formulation of the detergent composition to include the alkali metal carbonate, enzyme and stabilizing agent. Alternatively, a cleaning composition may be provided in two or more parts, such that the overall cleaning composition is formed in the stabilized use solution upon combination of two or more compositions. Each of these embodiments are included within the following description of the methods of the invention.

In one embodiment, the cleaning compositions may be provided as a concentrate such that the cleaning composition is substantially free of any added water or the concentrate may contain a nominal amount of water. The concentrate can be formulated without any water or can be provided with a relatively small amount of water in order to reduce the expense of transporting the concentrate. For example, the composition concentrate can be provided in a variety of solid compositions, including for example, as a capsule or pellet of compressed powder, a pressed, extruded and/or cast solid, or loose powder, either contained by a water soluble material or not. In the case of providing the capsule or pellet of the composition in a material, the capsule or pellet can be introduced into a volume of water, and if present the water soluble material can solubilize, degrade, or disperse to allow contact of the composition concentrate with the water. For the purposes of this disclosure, the terms "capsule" and "pellet" are used for exemplary purposes and are not intended to limit the delivery mode of the invention to a particular shape. When provided as a liquid concentrate composition, the concentrate can be diluted through dispensing equipment using aspirators, peristaltic pumps, gear pumps, mass flow meters, and the like. This liquid concentrate embodiment can also be delivered in bottles, jars, dosing bottles, bottles with dosing caps, and the like. The liquid concentrate composition can be filled into a multi-chambered cartridge insert that is then placed in a spray bottle or other delivery device filled with a pre-measured amount of water.

In yet another embodiment, the concentrate composition can be provided in a solid form that resists crumbling or other degradation until placed into a container. Such container may either be filled with water before placing the composition concentrate into the container, or it may be filled with water after the composition concentrate is placed into the container. In either case, the solid concentrate composition dissolves, solubilizes, or otherwise disintegrates upon contact with water. In a particular embodiment, the solid concentrate composition dissolves rapidly thereby allowing the concentrate composition to become a use composition and further allowing the end user to apply the use composition to a surface in need of cleaning In another embodiment, the solid concentrate composition can be diluted through dispensing equipment whereby water is sprayed at the solid composition (e.g. a compressed solid) forming the use solution. The water flow is delivered at a relatively constant rate using mechanical, electrical, or hydraulic controls and the like. The solid concentrate composition can also be diluted through dispensing equipment whereby water flows around the solid, creating a use solution as the solid concentrate dissolves. The solid concentrate composition can also be diluted through pellet, tablet, powder and paste dispensers, and the like.

Conventional detergent dispensing equipment can be employed according to the invention. For example, commercially available detergent dispensing equipment which can be used according to the invention are available under the name Solid System™ from Ecolab, Inc. Use of such dispensing equipment results in the erosion of a detergent composition by a water source to form the aqueous use solution according to the invention.

The water used to dilute the concentrate (water of dilution) can be available at the locale or site of dilution. The water of dilution may contain varying levels of hardness depending upon the locale. Service water available from various municipalities have varying levels of hardness. It is desirable to provide a concentrate that can handle the hardness levels found in the service water of various municipalities. The water of dilution that is used to dilute the concentrate can be characterized as hard water when it includes at least 1 grain hardness. It is expected that the water of dilution can include at least 5 grains hardness, at least 10 grains hardness, or at least 20 grains hardness.

A use solution may be prepared from the concentrate by diluting the concentrate with water at a dilution ratio that provides a use solution having desired detersive properties. The water that is used to dilute the concentrate to form the use composition can be referred to as water of dilution or a diluent, and can vary from one location to another. The typical dilution factor is between approximately 1 and approximately 10,000 but will depend on factors including water hardness, the amount of soil to be removed and the like. In an embodiment, the concentrate is diluted at a ratio of between about 1:1 and about 1:10,000 concentrate to water. Particularly, the concentrate is diluted at a ratio of between about 1:1 and about 1:1,000 concentrate to water. If the use solution is required to remove tough or heavy soils, it is expected that the concentrate can be diluted with the water of dilution at a weight ratio of at least 1:1 and up to 1:8. If a light duty cleaning use solution is desired, it is expected that the concentrate can be diluted at a weight ratio of concentrate to water of dilution of up to about 1:256.

In some aspects of the invention, in a use solution, the detergent composition is present between about 1 ppm and about 10,000 ppm, preferably between about 10 ppm and about 5000 ppm, more preferably between about 10 ppm and about 2000 ppm, and in a most preferred embodiment between about 10 ppm and about 5000 ppm.

The methods according to the invention are directed to cleaning a substrate, such as ware in a warewash application, having numerous beneficial results, including enhancing detergency of an optionally low-phosphorus, carbonate alkaline detergent composition containing stabilized enzymes (and/or a stabilized use solution), wherein the detergent composition is more effective in removing soils, preventing redeposition of the soils, and maintains low-foaming of the wash water.

In use, a cleaning composition including the stabilized enzymes is applied to a surface to be washed during a washing step of a wash cycle. A wash cycle may include at least a washing step and a rinsing step and may optionally also include a pre-rinsing step. The wash cycle involves dissolving a cleaning composition, which may include according to the invention components such as, for example, an alkali metal carbonate alkalinity sources, protease enzymes and stabilizing agents, and optionally other functional ingredients such as builders, surfactants, corrosion inhibitors and the like. During the rinsing step, generally warm or hot water flows over the surfaces to be washed. The rinse water may include components such as, for example, surfactants or rinse aids. The cleaning composition is intended for use only during the washing step of the wash cycle and is not used during the rinsing step.

According to further embodiments of the invention, the amount of enzyme needed to clean and remove soils for a particular application of use varies according to the type of cleaning application and the soils encountered in such applications. According to various embodiments of the invention, levels of enzymes in an aqueous use solution are effective at or below approximately 0.1 ppm, 0.5 ppm, 1 ppm, 10 ppm, 100 ppm, or 200 ppm. According to an embodiment, use levels of enzymes may be as great as 200 ppm.

According to the invention, the active level of enzyme in the aqueous use solution may be modified according to the precise requirements of the cleaning application. For example, the amount of enzyme formulated into the enzyme composition may vary. Alternatively, as one skilled in the art will appreciate, the active level of the aqueous use solution may be adjusted to a desired level through control of the wash time, water temperature at which the water source contacts the enzyme composition or the enzyme and detergent composition in order to form the aqueous use solution and the detergent selection and concentration. According to a preferred embodiment, a stabilized, aqueous use solution comprises between approximately 0.1 ppm and 100 ppm enzyme, preferably between about 0.5 ppm and about 50 ppm, and more preferably between approximately 1 ppm and 20 ppm enzyme.

During the washing step, the cleaning composition contacts the surface and works to clean protein and other residue and/or soils from the surface, such as ware. In addition, the stabilized use solution of the cleaning composition aids in preventing soils from depositing onto the surface. Although the stabilizing agent and enzymes (e.g. protease) are generally discussed as being a part of the cleaning composition, the stabilizing agent and/or enzymes can optionally be added to the washing step of the wash cycle as a separate component. Thus, in one embodiment, the stabilizing agent and/or enzymes is introduced into the washing step of a wash cycle independent of a detergent composition. In an aspect, when provided as a separate component, the stabilizing agent and/or enzymes may be provided at a relatively high level of stabilizing agent and/or enzymes, up to about 100%, in liquid or solid form and may be introduced manually or automatically.

Beneficially, according to the methods of the invention the stabilized use solutions allow enzymes to be formulated for use under high temperatures for periods of at least 20 minutes. In another aspect, the stabilized use solutions allow enzymes to be formulated for use under high temperatures for periods of at least 20 minutes to about 2 hours or longer. In an aspect, the compositions are suitable for use at temperatures of at least about 150° F., at least about 160° F., at least about 170° F., and at least about 180° F. for at least 20 minutes, or greater. In a preferred aspect, the compositions are suitable for use at temperatures from about 65° C. to at least about 80° C. for at least about 20 minutes. The stabilization of the enzymes can be measured by retaining enzymatic activity and cleaning performance under the high temperature conditions for such periods of time.

As a further benefit the methods according to the invention may further be used in any cleaning application wherein water sustainability is desired. According to the embodiments of the invention, the use of stabilized enzyme detergent compositions further provides a benefit of removing soils from the water and increases the time frame in which water changes are required, such that less water is used due to decreased need to replace wash water (or sump water in a ware wash application). Such prolonged use decreases the volume of clean water used in a cleaning application and decreases the amount of energy used to heat wash water sources for various cleaning applications.

The ability of the cleaning composition to reduce the amount of residual water can be enhanced by contacting the ware with a rinse aid composition during the rinsing step of a wash cycle. The rinse aid composition significantly decreases the amount of residual water left on ware cleaned with the cleaning composition. The rinse aid composition is present during the rinsing step at between about 1 and about 5 mL per rinse cycle (which may vary depending upon the total volume of a rinse cycle, which varies by machine size and type.

All publications and patent applications in this specification are indicative of the level of ordinary skill in the art to which this invention pertains. All publications and patent applications are herein incorporated by reference to the same extent as if each individual publication or patent application was specifically and individually indicated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

Multi-Cycle Spot, Film and Soil Removal Test. Testing to evaluate the stabilization of detergent use solutions including protease enzymes was conducted to test the ability of compositions to clean glass and plastic. The cleaning formulation shown in Table 2 was employed as the control detergent. This detergent was then modified to further include enzymes and potential stabilizing agents according to embodiments of the invention.

TABLE 2

| Raw Material of Control Formulation | % of Formula |
|---|---|
| Dense ash | 50-75 |
| Sodium citrate dihydrate | 2-10 |
| Trilon M Granules SG (MGDA) | 2-10 |
| Alkoxylated alcohol surfactant | 1-8 |
| Amphoteric surfactant | 0.1-5 |
| Water | 0.1-20 |
| Sugar | 1-5 |
| Polycarboxylic acids | 1-15 |
| Briquest 301 (ATMP) 50% (amino trimethylene phosphonic acid) | 0.1-5 |
| TOTAL | 100.0 |

The control formulation was used to test the ability of exemplary enzyme containing detergent use solutions to clean and/or prevent redeposition of food soil on glass and plastic ware. Six 10 oz. Libbey heat resistant glass tumblers and two plastic tumblers were used. The glass tumblers were cleaned prior to use in an institutional dishmachine. New plastic tumblers were used for each multi-cycle soil removal experiment.

A food soil solution was prepared using a 1:1 (by volume) combination of Campbell's Cream of Chicken Soup and Kemp's Whole Milk. The glass and plastic tumblers were soiled by rolling the glasses in the 1:1 mixture of Campbell's Cream of Chicken Soup: Kemp's Whole Milk soil three times. The glasses were then placed in an oven at about 160° F. for about 8 minutes.

After filling the dishmachine with 15-17 grain water, the heaters were turned on. The wash water temperature was adjusted to about 155° F.-160° F. The final rinse temperature was adjusted to about 180° F.-185° F. The rinse pressure was adjusted to between about 20-25 psi. The dishmachine was primed with the use solutions of the detergent compositions, enzyme and potential enzyme stabilizing agents as set forth in Table 3. The examined potential enzyme stabilizing agents included: glycerol, hydrolyzed protein source (GNC Pro Performance, Amino 1000), and mashed potato flakes/buds (Clear Value) as the soluble starch source.

TABLE 3

| Formula | Use solutions |
|---|---|
| Formula 1 | 500 ppm Control |
| Formula 2 | 500 ppm Control<br>10 ppm Esperase 8.0 L |
| Formula 3 | 500 ppm Control<br>10 ppm Esperase 8.0 L<br>1000 ppm glycerol |
| Formula 4 | 500 ppm Control<br>10 ppm Esperase 8.0 L<br>2000 ppm hydrolyzed protein |

TABLE 3-continued

| Formula | Use solutions |
|---|---|
| Formula 5 | 500 ppm Control<br>10 ppm Esperase 8.0 L<br>2000 ppm starch source |
| Formula 6 | 500 ppm Control<br>2000 ppm starch source |

Figure 5:
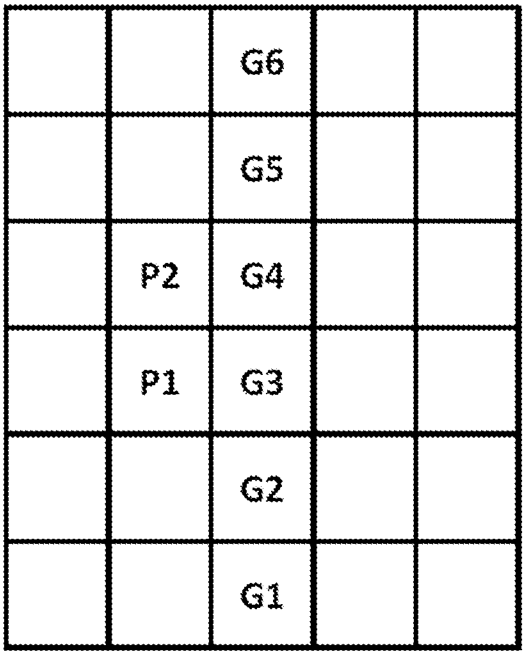
FIG. 5 shows the arrangement of soiled glass and plastic tumblers placed in a Raburn rack in the dishmachine in Example 1.

The soiled glass and plastic tumblers were placed in the Raburn rack according to the arrangement shown in FIG. 5 (P=plastic tumbler; G=glass tumbler) and the rack was placed inside the dishmachine.

The dishmachine was started and an automatic cycle was run. When the cycle ended, the top of the glass and plastic tumblers were mopped with a dry towel. The glass and plastic tumblers were removed and the soup/milk soiling procedure was repeated. At the beginning of each cycle, an appropriate amount of detergent was added to the wash tank to make up for the rinse dilution. Note, when an enzyme or additive was used, only an initial dose was charged into the sump at the start of the multi-cycle test. The soiling and washing steps were repeated for a total of seven cycles.

The glass and plastic tumblers were then graded for protein accumulation using Commassie Brilliant Blue R stain followed by destaining with an aqueous acetic acid/methanol solution. The Commassie Brilliant Blue R stain was prepared by combining 0.05 wt % Commassie Brilliant Blue R dye with 40 wt % methanol, 10 wt % acetic acid and ~50 wt % DI water. The solution was mixed until all the dye was dissolved. The destaining solution consisted of 40 wt % methanol, 10 wt % acetic acid, and 50 wt % DI water. The amount of protein remaining on the glass and plastic tumblers after destaining was rated visually on a scale of 1 to 5.

Figure 2:
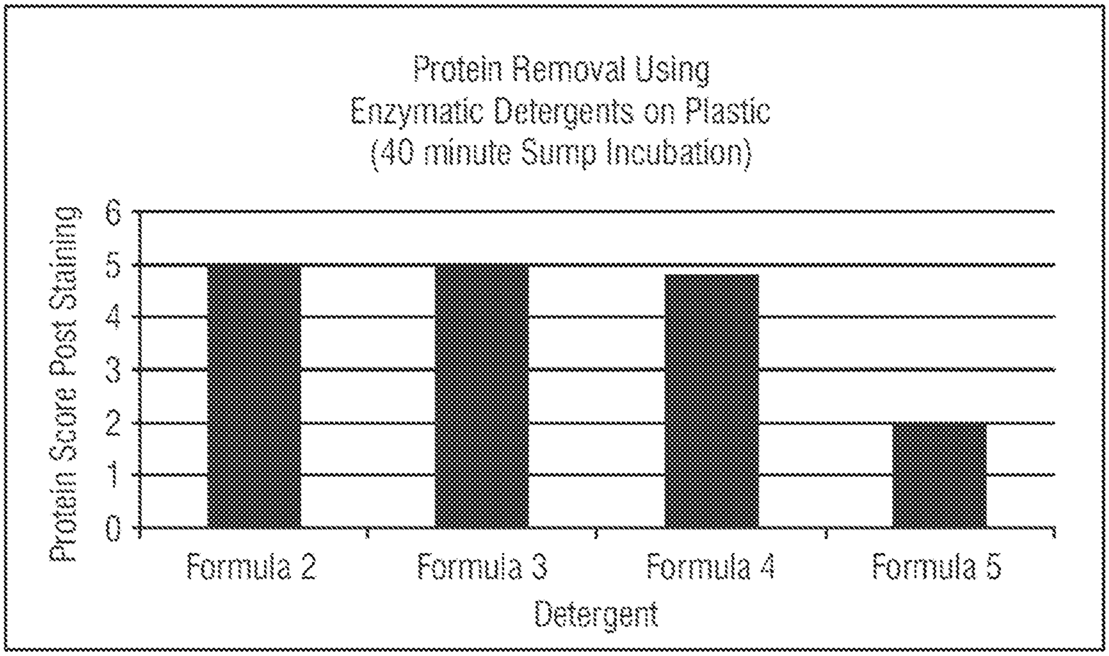

A rating of 1 indicated no protein was detected after destaining. A rating of 2 indicated that 20% of surface was covered with protein after destaining. A rating of 3 indicated that 40% of surface was covered with protein after destaining. A rating of 4 indicated that 60% of surface was covered with protein after destaining. A rating of 5 indicated that at least 80% of the surface was coated with protein after destaining. The ratings of the glass and plastic tumblers tested for soil removal were averaged to determine an average soil removal rating. The results are shown below in Tables 4-5 and in FIGS. 1-2. Photographs of the non-stained and post-staining scored glasses and plastic tumblers were analyzed to determine the graded scoring. The sump dwell time refers to the amount of time the various formulations remained in the sump at the heated temperature and pH conditions prior to the start of the multi-cycle test to evaluate the stability of the enzymes and/or the use solutions containing the enzymes.

TABLE 4

Averaged grading scores (Glasses)

| | Sump Dwell Time (minutes) | | |
|---|---|---|---|
| Post-stained | T = 0 | T = 20 | T = 40 |
| Formula 1 | 5.0 | — | — |
| Formula 2 | 2.3 | 4.9 | 5.0 |
| Formula 3 | 4.9 | 5.0 | 4.9 |
| Formula 4 | — | — | 4.8 |
| Formula 5 | 2.3 | — | 2.3 |
| Formula 6 | 5.0 | — | — |

TABLE 5

| Averaged grading scores (Plastic tumblers) | | | |
|---|---|---|---|
| | Sump Dwell Time (minutes) | | |
| Post-stained | T = 0 | T = 20 | T = 40 |
| Formula 1 | 5.0 | — | — |
| Formula 2 | 2.0 | 5.0 | 5.0 |
| Formula 3 | 5.0 | 5.0 | 5.0 |
| Formula 4 | — | — | 4.8 |
| Formula 5 | 2.3 | — | 2.0 |
| Formula 6 | 5.0 | — | — |

Not all dwell times provide post-staining data points as the T=40 time for sump dwell is a minimum data point for efficacy according to embodiments of the invention. In an aspect of use of the cleaning compositions according to the invention, it would be reasonable to require cleaning performance based on dwell times up to about 2 hours.

The testing illustrates the effect of sump dwell time (or incubation time) on the stability and detergent efficacy of the protease enzyme employed in an institutional warewash machine, as determined by performance testing. The efficacy of various additives into the sump with the enzyme were compared. As referred to herein, “dwell time” refers to an idle incubation period of time prior to initiating machine testing according to the Examples described herein. Dwell times listed are therefore in addition to the total test time required for the various cycles of testing (e.g. approximately 1.5 hours required for multi cycle test).

In particular the results of the multi-cycle cleaning using detergent use solutions according to the invention illustrate that the addition of enzymes enhance protein removal when formulated with sodium carbonate based formulations without a dwell time between detergent addition to the sump and initiation of the multicycle experiment (indicated by Formula 2, T=0). The protein removal of enzymatic, sodium carbonate based detergents rapidly declines if a 40 minute delay occurs between detergent addition to the sump and initiation of the multicycle test (see T=40, Formula 2). Formulation 5 containing high molecular weight potato starch performs the same with and without a 40 minute dwell time illustrating efficacy of the enzyme stabilizing agent according to the invention. In contrast, formulations containing specific proteins (Formula 4) or low molecular weight sugars (glycerol, Formula 3) failed to maintain performance over a period of 40 minutes. The results indicate that the performance of enzymatic, sodium carbonate based detergents can be maintained under industrial dishwashing conditions with the addition of high molecular weight poly sugars such as potato starch.

Example 2

The antiredeposition benefits of sodium carbonate (or alkali metal carbonate) detergents containing enzymes was further analyzed to demonstrate efficacy, in need of stabilization for prolonged efficacy of the enzymes.

A hot point/beef stew food soil is prepared by melting 15.5 sticks of Blue Bonnet margarine in a covered container to prevent water from evaporating. The following ingredients were mixed using a commercial blender: melted margarine; a 29 oz. can of Hunt’s Tomato Sauce; 436.4 g Nestle Carnation Instant Nonfat Dry Milk; and two 24 oz. cans of Dinty Moore Beef Stew. The contents were blended for at least 3 minutes until all chunks and lumps were broken down. A blue dye (Commassie Brilliant Blue R) for visualizing protein soil on the glasses was prepared by combining 0.05 wt % dye with 40 wt % methanol, 10 wt % acetic acid, and approximately 50 wt % DI water. The solution is mixed until all the dye is dissolved. The destaining solution consisted of 40 wt % methanol, 10 wt % acetic acid, and 50 wt % DI water.

A 50 cycle test using food soils was performed using an Institutional machine with 17 gpg water. The tests were run with 1000 ppm of the Formulation in Table 6.

TABLE 6

| Description | Wt-% |
|---|---|
| Alkaline source | 75-95 |
| Citrate salt | 2-10 |
| Surfactant | 1-8 |
| Ash mono | 1-30 |
| Water | 0.1-20 |
| Sugar | 1-5 |
| Polymer | 0.1-10 |
| Chelant | 0.1-5 |

Figure 3A:
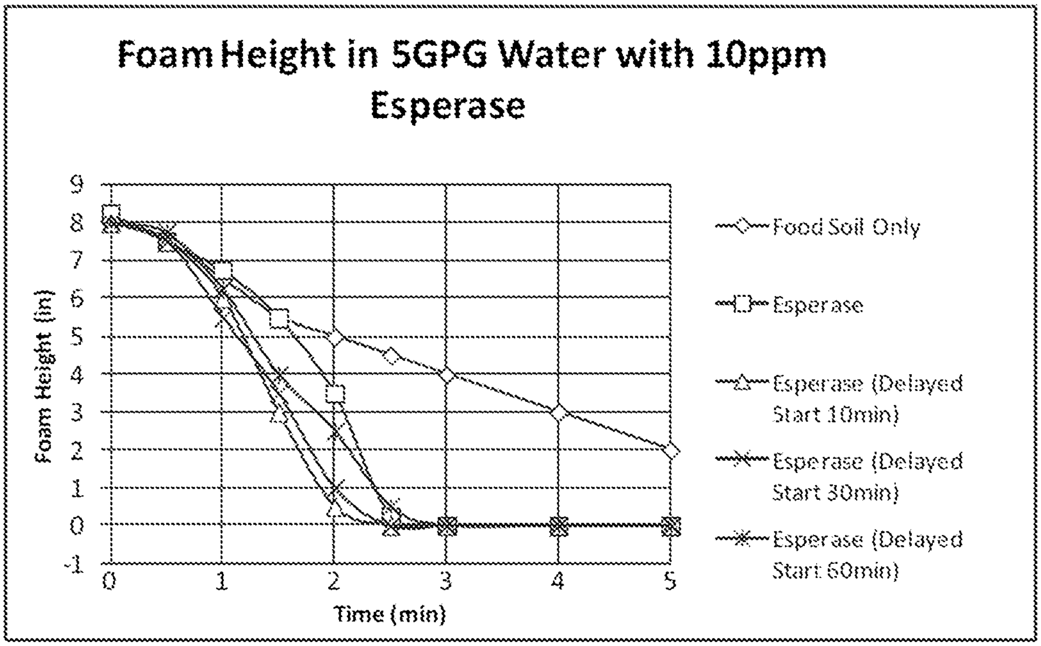
FIGS. 3A-3C show anti-foaming benefits using the enzyme Esperase according to embodiments of the invention.
Figure 3B:
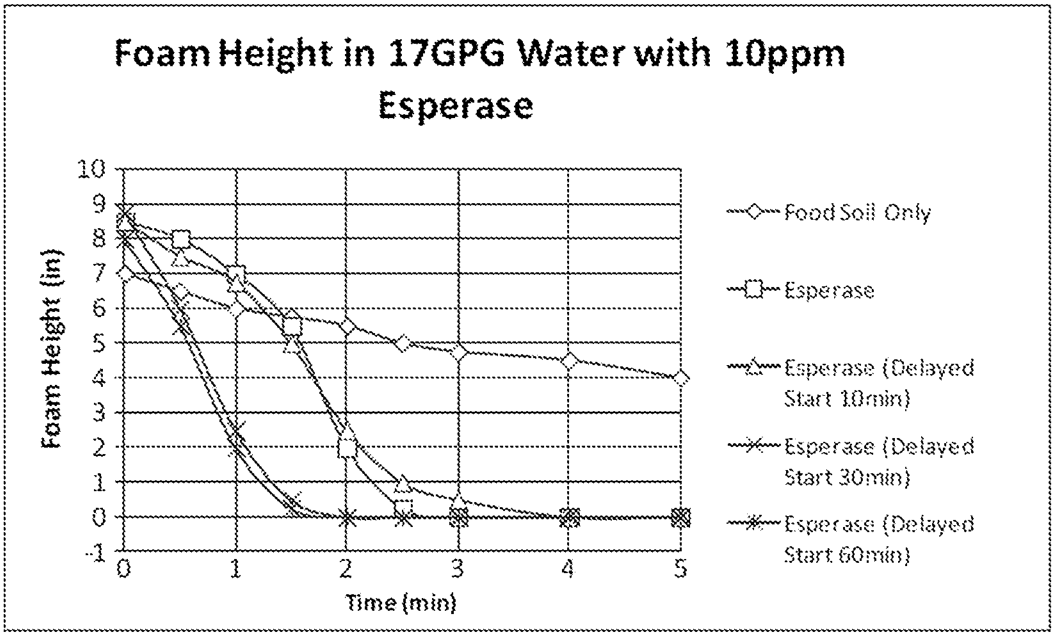
Figure 3C:
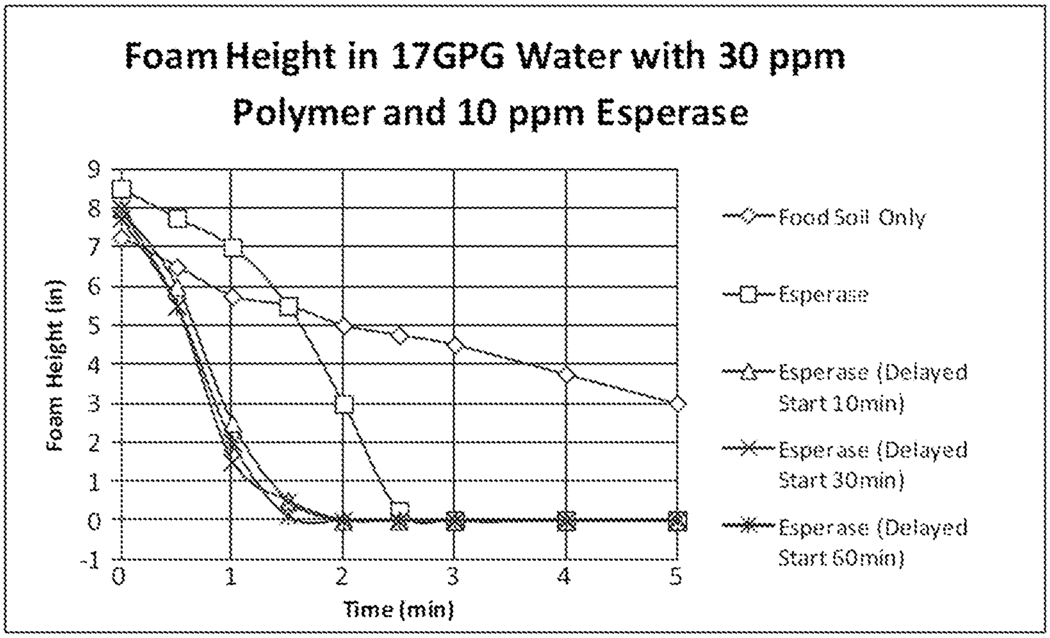

As shown in FIG. 3, as little as 1 ppm enzyme in a warewash sump in the presence of soil effectively prevents redeposition. The efficacy of enzyme in the presence of up to 4000 ppm Hot Point Soil (HPS) is shown in FIG. 3. On the contrary, the absence of enzyme present in the warewash sump (see control detergent) results in the glasses showing a positive Commassie blue response to protein redeposition. With enzyme present, the protein soil is not prevented from redepositing on the ware. In addition, inclusion of the enzyme provides the benefit of film prevention.

Example 3

The defoaming benefits of sodium carbonate (or alkali metal carbonate) detergents containing enzymes was further analyzed to demonstrate another aspect of efficacy requiring stabilization for prolonged efficacy of the enzymes.

Testing methodology for the Glewwe procedure using milk soil included the following. Rinse the Glewwe with the water type being used. Add 3 L of water, turn the pump on for 1 min, drain. Add 3 L of water to the cylinder. Close the lid, switch the pump on, and open the steam valve. Heat the water to 160° F. Close the steam valve. Turn the pump off and add in food soil (powdered milk), ash, and Esperase 8.0 L. Turn the pump on, with the lid closed, and run for 1 min at 8 psi. Turn the pump off and record the foam height at 0, 0.5, 1, 1.5, 2, 2.5, 3, 4, and 5 minutes.

For delayed start tests, add the chemicals to the solution once the desired temperature is reached. Run the pump for 3 seconds to mix the solution. Let the solution sit for the desired time. Turn the pump on, with the lid closed, and run for 1 min at 8 psi. Turn the pump off and record the foam height at 0, 0.5, 1, 1.5, 2, 2.5, 3, 4, and 5 minutes. Formulations and results are shown below in Table 7. A polymer blend was employed with an active dose of 30 ppm polymer.

TABLE 7

| Formula Variations | Enzyme conc. ppm | Ash ppm | Food Soil ppm | Water Hardness gpg | Polymer Blend (active) ppm | Temp. (° F.) | Final Temp (F.) | Pressure psi | Run Time (min) | 0 | 0.5 | 1 | 1.5 | 2 | 2.5 | 3 | 4 | 5 | Comments |
|---|---|---|---|---|---|---|---|---|---|---|---|---|---|---|---|---|---|---|---|
| | | | | | | | | | | Foam Heights (inches) | | | | | | | | | |
| Food Soil Only | 0 | 1000 | 2000 | 1 | — | 160 | 160 | 8 | 1 | 7 | 5.5 | 4 | 2.5 | 1 | 0.125 | 0 | 0 | 0 | at 2.5 min there is a very thin film of foam |
| Esperase 8.0 L | 10 | 1000 | 2000 | 1 | — | 160 | 160 | 8 | 1 | 8 | 7.5 | 5.5 | 4 | 2 | 0.25 | 0 | 0 | 0 | |
| Esperase 8.0 L (Delayed Start 10 min) | 10 | 1000 | 2000 | 1 | — | 160 | 150 | 8 | 1 | 8 | 7.5 | 6 | 4.5 | 1.5 | 0.05 | 0 | 0 | 0 | |
| Esperase 8.0 L (Delayed Start 30 min) | 10 | 1000 | 2000 | 1 | — | 160 | 130 | 8 | 1 | 8 | 7 | 4 | 0.75 | 0 | 0 | 0 | 0 | 0 | |
| Esperase 8.0 L (Delayed Start 60 min) | 10 | 1000 | 2000 | 1 | — | 160 | 121 | 8 | 1 | 8 | 7.75 | 5 | 1.25 | 0 | 0 | 0 | 0 | 0 | |
| Food Soil Only | 0 | 1000 | 2000 | 6 | — | 160 | 160 | 8 | 1 | 8 | 7.5 | 6.5 | 5.5 | 5 | 4.5 | 4 | 3 | 2 | Thick and sticky foam |
| Esperase 8.0 L | 10 | 1000 | 2000 | 6 | — | 160 | 160 | 8 | 1 | 8.25 | 7.5 | 6.75 | 5.5 | 3.5 | 0.25 | 0.005 | 0 | 0 | 3 min-half of soln was clear and half had a thin layer |
| Esperase 8.0 L (Delayed Start 10 min) | 10 | 1000 | 2000 | 6 | — | 160 | 150 | 8 | 1 | 8 | 7.5 | 6 | 3 | 0.5 | 0 | 0 | 0 | 0 | |
| Esperase 8.0 L (Delayed Start 30 min) | 10 | 1000 | 2000 | 6 | — | 160 | 134 | 8 | 1 | 8 | 7.5 | 5.5 | 3.5 | 1 | 0 | 0 | 0 | 0 | |
| Esperase 8.0 L (Delayed Start 60 min) | 10 | 1000 | 2000 | 6 | — | 160 | 121 | 8 | 1 | 8 | 7.75 | 6.25 | 4 | 2.5 | 0.5 | 0 | 0 | 0 | |
| Food Soil Only | 0 | 1000 | 2000 | 20 | — | 160 | 160 | 8 | 1 | 7 | 6.5 | 6 | 5.75 | 5.5 | 5 | 4.75 | 4.5 | 4 | |
| Esperase 8.0 L | 10 | 1000 | 2000 | 20 | — | 160 | 160 | 8 | 1 | 8.5 | 8 | 7 | 5.5 | 2 | 0.25 | 0 | 0 | 0 | Very thin film of foam |
| Esperase 8.0 L (Delayed Start 10 min) | 10 | 1000 | 2000 | 20 | — | 160 | 148 | 8 | 1 | 8.5 | 7.5 | 6.75 | 5 | 2.5 | 1 | 0.5 | 0 | 0 | Very thin film of foam |
| Esperase 8.0 L (Delayed Start 30 min) | 10 | 1000 | 2000 | 20 | — | 160 | 130 | 8 | 1 | 8.75 | 6 | 2.5 | 0.5 | 0 | 0 | 0 | 0 | 0 | Very thin film of foam |
| Esperase 8.0 L (Delayed Start 60 min) | 10 | 1000 | 2000 | 20 | — | 160 | 112 | 8 | 1 | 8 | 5.5 | 2 | 0.25 | 0 | 0 | 0 | 0 | 0 | |
| Food Soil Only | 0 | 1000 | 2000 | 17 | 30 | 160 | 160 | 8 | 1 | 7.25 | 6.5 | 5.75 | 5.5 | 5 | 4.75 | 4.5 | 3.75 | 3 | |

TABLE 7-continued

| Formula Variations | Enzyme conc. ppm | Ash ppm | Food Soil ppm | Water Hardness gpg | Polymer Blend (active) ppm | Temp. (° F.) | Final Temp (F.) | Pressure psi | Run Time (min) | 0 | 0.5 | 1 | 1.5 | 2 | 2.5 | 3 | 4 | 5 | Comments |
|---|---|---|---|---|---|---|---|---|---|---|---|---|---|---|---|---|---|---|---|
| | | | | | | | | | | Foam Heights (inches) | | | | | | | | | |
| Esperase 8.0 L | 10 | 1000 | 2000 | 17 | 30 | 160 | 160 | 8 | 1 | 8.5 | 7.75 | 7 | 5.5 | 3 | 0.25 | 0 | 0 | 0 | Very thin film of foam |
| Esperase 8.0 L (Delayed Start 10 min) | 10 | 1000 | 2000 | 17 | 30 | 160 | 146 | 8 | 1 | 8 | 6 | 2.5 | 0.5 | 0 | 0 | 0 | 0 | 0 | Very thin film of foam |
| Esperase 8.0 L (Delayed Start 30 min) | 10 | 1000 | 2000 | 17 | 30 | 160 | 129 | 8 | 1 | 8 | 5.5 | 1.5 | 0.5 | 0 | 0 | 0 | 0 | 0 | 1:43-no foam |
| Esperase 8.0 L (Delayed Start 60 min) | 10 | 1000 | 2000 | 17 | 30 | 160 | 112 | 8 | 1 | 7.75 | 5.5 | 2 | 0.125 | 0 | 0 | 0 | 0 | 0 | 1:38-no foam |

Figure 4A:
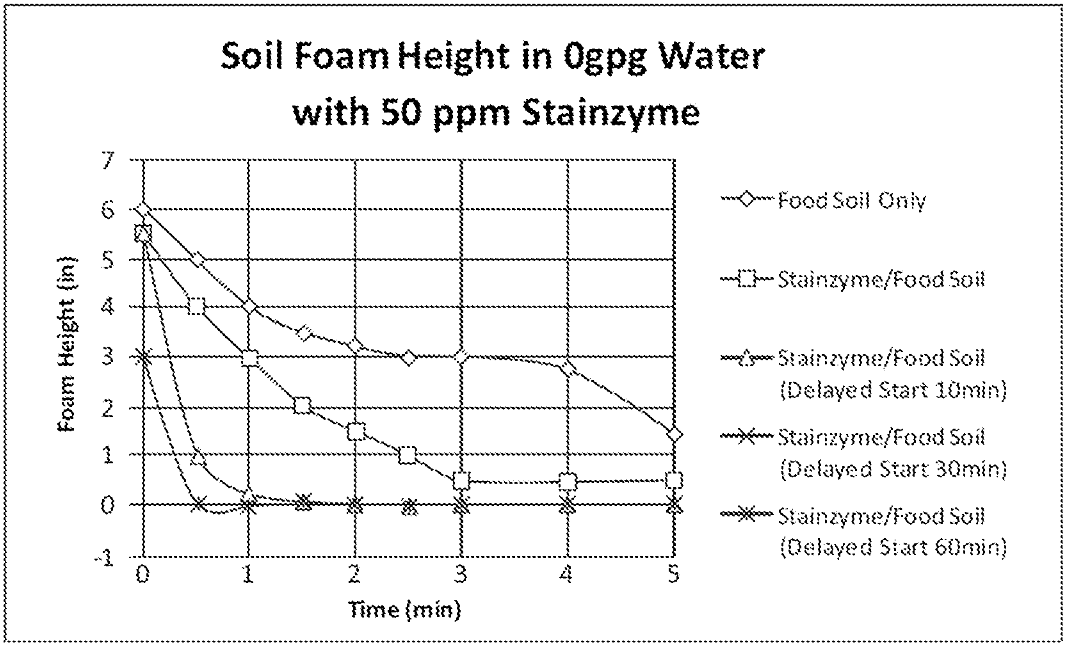
FIGS. 4A-4D show anti-foaming benefits using the enzyme Stainzyme according to embodiments of the invention.
Figure 4B:
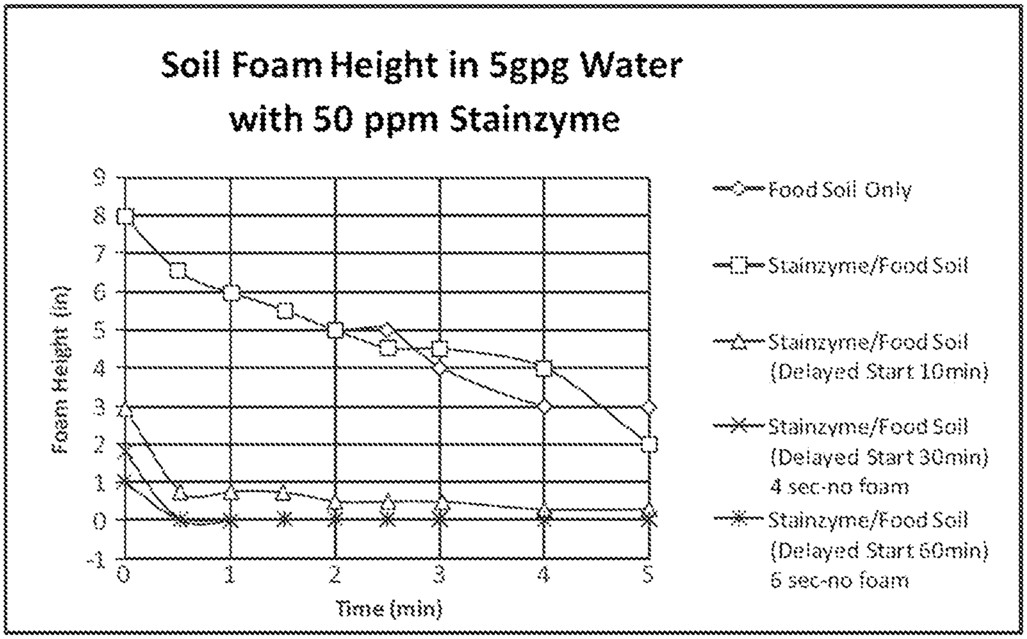
Figure 4C:
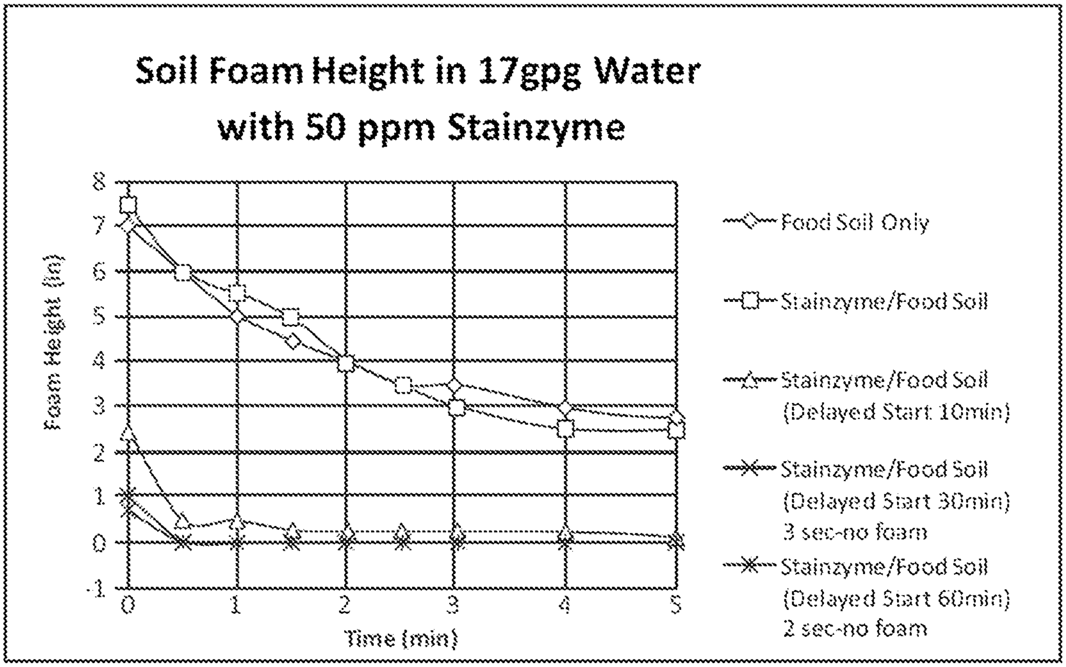
Figure 4D:
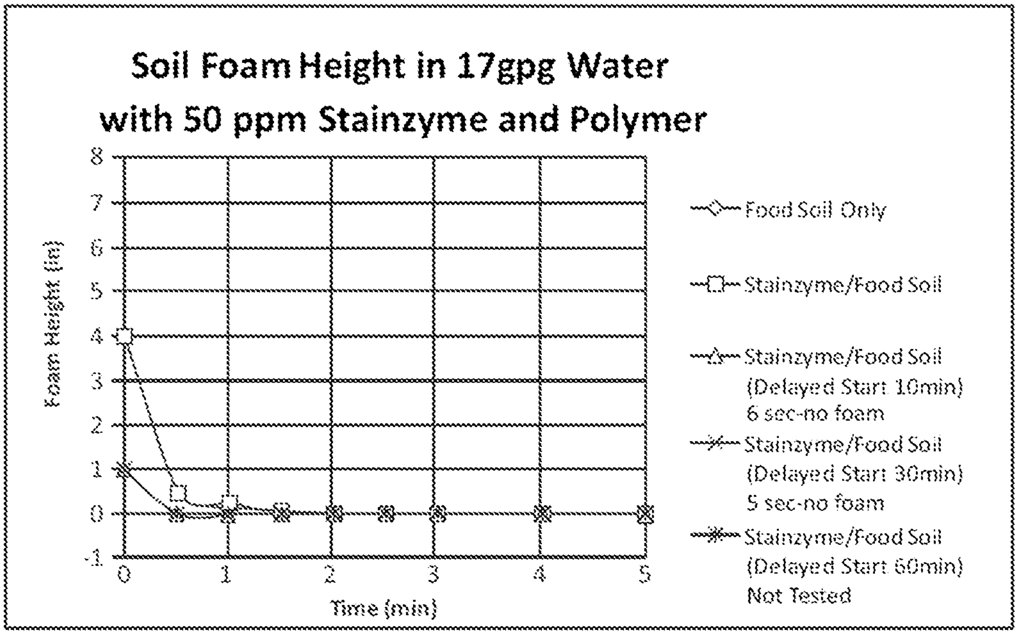

As shown in FIGS. 4A-C, the inclusion of enzymes into the alkali metal carbonate detergents show overall benefits to the warewashing process by mitigating foam. Decreased foaming allows dishmachine pumps to work efficiently. For example, in high foaming applications pumps cavitate and lose pressure, thus cleaning efficiency decreases. Beneficially, in an aspect of the invention, the defoaming benefits of the enzymes in the detergent use solution reduces the concentration of defoaming surfactants required in a detergent composition.

Example 4

The methods of Example 3 were employed to further analyze the defoaming benefits of sodium carbonate (or alkali metal carbonate) detergents containing enzymes. A rice soil (instead of milk soil of Example 3) and Stainzyme 12L as the protease enzyme were evaluated. A rice slurry was prepared by adding 1 cup cooked jasmine rice (using 5 gpg water) to a blender with 100 g cold 5 gpg water and blending to a slurry. The slurry was mixed for 10 seconds before the testing initiated.

Tested formulations and results are shown in below in Table 8. A polymer blend was employed with an active dose of 30 ppm. The Enzyme employed was Stainzyme 12 L at 50 ppm.

TABLE 8

| Formula Variations | Enzyme conc. ppm | Ash ppm | Food Soil ppm | Water Hardness gpg | Polymer Blend (active) ppm | Temp (° F.) | Final Temp (F.) | Pressure psi | Run Time (min) | 0 | 0.5 | 1 | 1.5 | 2 | 2.5 | 3 | 4 | 5 | Comments |
|---|---|---|---|---|---|---|---|---|---|---|---|---|---|---|---|---|---|---|---|
| | | | | | | | | | | Foam Heights (inches) | | | | | | | | | |
| Food Soil Only | 0 | 1000 | 2000 | 0 | — | 160 | 160 | 8 | 1 | 6 | 5 | 4 | 3.5 | 3.25 | 3 | 3 | 2.75 | 1.5 | |
| Enzyme/Food Soil | 50 | 1000 | 2000 | 0 | — | 160 | 160 | 8 | 1 | 5.5 | 4 | 3 | 2 | 1.5 | 1 | 0.5 | 0.5 | 0.5 | |
| Enzyme/Food Soil (Delayed Start 10 min) | 50 | 1000 | 2000 | 0 | — | 160 | 143 | 8 | 1 | 5.5 | 1 | 0.25 | 0.124 | 0.05 | 0.05 | 0.05 | 0.05 | 0.05 | |
| Enzyme/Food Soil (Delayed Start 30 min) | 50 | 1000 | 2000 | 0 | — | 160 | 128 | 8 | 1 | 3 | 0.05 | 0.05 | 0.05 | 0.05 | 0.05 | 0.05 | 0.05 | 0.05 | |

TABLE 8-continued

| Formula Variations | Enzyme conc. ppm | Ash ppm | Food Soil ppm | Water Hardness gpg | Polymer Blend (active) ppm | Temp (° F.) | Final Temp (F.) | Pressure psi | Run Time (min) | 0 | 0.5 | 1 | 1.5 | 2 | 2.5 | 3 | 4 | 5 | Comments |
|---|---|---|---|---|---|---|---|---|---|---|---|---|---|---|---|---|---|---|---|
| | | | | | | | | | | Foam Heights (inches) | | | | | | | | | |
| Enzyme/Food Soil (Delayed Start 60 min) | 50 | 1000 | 2000 | 0 | — | 160 | 112 | 8 | 1 | 3 | 0.05 | 0.005 | 0 | 0 | 0 | 0 | 0 | 0 | ½ cleared ½ this film |
| Food Soil Only | 0 | 1000 | 2000 | 5 | — | 160 | 160 | 8 | 1 | 8 | 6.5 | 6 | 5.5 | 5 | 5 | 4 | 3 | 3 | Large air bubbles |
| Enzyme/Food Soil | 50 | 1000 | 2000 | 5 | — | 160 | 160 | 8 | 1 | 8 | 6.5 | 6 | 5.5 | 5 | 4.5 | 4.5 | 4 | 2 | Large air bubbles |
| Enzyme/Food Soil (Delayed Start 10 min) | 50 | 1000 | 2000 | 5 | — | 160 | 145 | 8 | 1 | 3 | 0.75 | 0.75 | 0.75 | 0.5 | 0.5 | 0.5 | 0.25 | 0.25 | |
| Enzyme/Food Soil (Delayed Start 30 min) | 50 | 1000 | 2000 | 5 | — | 160 | 130 | 8 | 1 | 1 | 0 | 0 | 0 | 0 | 0 | 0 | 0 | 0 | 4 sec-no foam |
| Enzyme/Food Soil (Delayed Start 60 min) | 50 | 1000 | 2000 | 5 | — | 160 | 115 | 8 | 1 | 8 | 0 | 0 | 0 | 0 | 0 | 0 | 0 | 0 | 6 sec-no foam |
| Food Soil Only | 0 | 1000 | 2000 | 17 | — | 160 | 160 | 8 | 1 | 7 | 6 | 5 | 4.5 | 4 | 3.5 | 3.5 | 3 | 2.75 | |
| Enzyme/Food Soil | 50 | 1000 | 2000 | 17 | — | 160 | 160 | 8 | 1 | 7.5 | 6 | 5.5 | 5 | 4 | 3.5 | 3 | 2.5 | 2.5 | Large air bubbles |
| Enzyme/Food Soil (Delayed Start 10 min) | 50 | 1000 | 2000 | 17 | — | 160 | 145 | 8 | 1 | 2.5 | 0.5 | 0.5 | 0.25 | 0.25 | 0.25 | 0.25 | 0.25 | 0.125 | |
| Enzyme/Food Soil (Delayed Start 30 min) | 50 | 1000 | 2000 | 17 | — | 160 | 130 | 8 | 1 | 1 | 0 | 0 | 0 | 0 | 0 | 0 | 0 | 0 | 3 sec-no foam |
| Enzyme/Food Soil (Delayed Start 60 min) | 50 | 1000 | 2000 | 17 | — | 160 | 113 | 8 | 1 | 0.75 | 0 | 0 | 0 | 0 | 0 | 0 | 0 | 0 | 2 sec-no foam |
| Food Soil Only | 0 | 1000 | 2000 | 17 | 30 | 160 | 160 | 8 | 1 | 4 | 0.5 | 0.125 | 0.05 | 0.005 | 0 | 0 | 0 | 0 | |
| Enzyme/Food Soil | 50 | 1000 | 2000 | 17 | 30 | 160 | 160 | 8 | 1 | 4 | 0.5 | 0.25 | 0.05 | 0.005 | 0 | 0 | 0 | 0 | |

TABLE 8-continued

| Formula Variations | Enzyme conc. ppm | Ash ppm | Food Soil ppm | Water Hardness gpg | Polymer Blend (active) ppm | Temp (° F.) | Final Temp (F.) | Pressure psi | Run Time (min) | 0 | 0.5 | 1 | 1.5 | 2 | 2.5 | 3 | 4 | 5 | Comments |
|---|---|---|---|---|---|---|---|---|---|---|---|---|---|---|---|---|---|---|---|
| | | | | | | | | | | Foam Heights (inches) | | | | | | | | | |
| Enzyme/Food Soil (Delayed Start 10 min) | 50 | 1000 | 2000 | 17 | 30 | 160 | 144 | 8 | 1 | 1 | 0 | 0 | 0 | 0 | 0 | 0 | 0 | 0 | 6 sec-no foam |
| Enzyme/Food Soil (Delayed Start 30 min) | 50 | 1000 | 2000 | 17 | 30 | 160 | 129 | 8 | 1 | 1 | 0 | 0 | 0 | 0 | 0 | 0 | 0 | 0 | 5 sec-no foam |
| Enzyme/Food Soil (Delayed Start 60 min) | 50 | 1000 | 2000 | 17 | 30 | 160 | | 8 | 1 | | | | | | | | | | not tested |

As further shown in FIGS. 5A-D, the inclusion of enzymes into the alkali metal carbonate detergents show overall benefits to the warewashing process by mitigating foam. Decreased foaming allows dishmachine pumps to work efficiently. For example, in high foaming applications pumps cavitate and lose pressure, thus cleaning efficiency decreases. Beneficially, in an aspect of the invention, the defoaming benefits of the enzymes of the detergent use solutions reduces the concentration of defoaming surfactants required in a detergent composition.

Example 5

Assays of enzyme activity in formulations (% retention) were conducted to simulate a wash condition in a beaker using the chemistry, temperature, and pH conditions relevant to warewash applications. Enzyme activity is an indicator of the stability of the protease enzyme in the detergent, specifically in an aqueous use solution within a sump (which is under conditions of high pH, temperature and dilution). The various enzyme stabilizing agents according to the invention were evaluated to determine which agents enhance the protease stability significantly.

The analysis by protease assay was conducted as follows. For the assays, a solid detergent composition containing the various enzyme stabilizing agents was used to generate an aqueous use solution evaluated herein.

Enzyme activity under warewash conditions was traced quantitatively using a standard protease assay. Samples were prepared under bench top conditions, whereby the detergent formulation with stabilizer was dissolved/suspended in water and maintained at warewash temperature in a stirring water bath. Enzyme addition was made via pipette and initiated the time course for assessing enzyme stability. Aliquots were taken at various time points and flash-frozen. A time=0 sample was prepared for each series by dissolving the detergent formulation, stabilizer and enzyme at room temperature, mixing thoroughly, and flash freezing. Samples were thawed and diluted as necessary in assay buffer for use in the protease assay. The assay monitored the direct reaction of the protease on a small, commercially available peptidyl substrate, with liberation of the product providing correlation to the active enzyme content. The product was detected using a plate reader with appreciable dynamic range (upper absorbance limit of the instrument >3.5). Enzyme activity levels were assessed relative to a calibration curve with average values for replicate tests used to map protease stability under warewash use conditions. Enzyme retention at each time point was calculated as the % enzyme activity relative to the time=0 sample.

TABLE 9

| Stabilizer | Time (minutes), t = 0 normalized to 100% | | | | | | | |
|---|---|---|---|---|---|---|---|---|
| | 0 | 5 | 10 | 20 | 40 | 60 | 120 | 240 |
| 2000 ppm potato buds | 100% | 92% | 95% | 95% | 82% | 71% | 50% | n/a |
| 1000 ppm potato buds | 100% | 103% | 101% | 98% | 87% | 77% | 56% | n/a |
| 100 ppm potato buds | 100% | 92% | 87% | 81% | 66% | 56% | 37% | n/a |
| 500 ppm gelatin | 100% | 100% | 95% | 90% | 81% | 73% | 57% | n/a |
| 100 ppm gelatin | 100% | 98% | 93% | 90% | 78% | 68% | 53% | n/a |
| 10 ppm gelatin | 100% | 86% | 75% | 63% | 48% | 35% | 26% | n/a |
| 500 ppm casein | 100% | 99% | 95% | 96% | 91% | 81% | 69% | n/a |
| 100 ppm casein | 100% | 98% | 93% | 88% | 77% | 67% | 47% | n/a |
| 10 ppm casein | 100% | 90% | 79% | 68% | 51% | 39% | 22% | n/a |
| 2000 ppm amino 1000 | 100% | 100% | 99% | 97% | 91% | 83% | 73% | 55% |
| 500 ppm amino 1000 | 100% | 97% | 94% | 88% | 78% | 68% | 50% | 28% |
| 100 ppm amino 1000 | 100% | 96% | 94% | 85% | 72% | 63% | 44% | 23% |
| No Stabilizer | 100% | 68% | 47% | 29% | 15% | 9% | 4% | n/a |

As shown in Table 9, the enzyme stabilizing agents evaluated improved enzyme stability for use at high alkalinity and high temperature conditions. In many instances the stabilizing agent results in at least about 30% enzyme retention, at least about 35% enzyme retention, at least about 40% enzyme retention, at least about 45% enzyme retention, at least about 50% enzyme retention, at least about 55% enzyme retention, at least about 60% enzyme retention, at least about 65% enzyme retention, at least about 70% enzyme retention, or at least about 75% enzyme retention for 20 minutes at high alkalinity and high temperature conditions.

Also shown in Table 9, the Amino 1000 stabilizing agent was evaluated at an extended 4 hour point due to the extra benefit seen in the evaluation. However, as shown from the other amine and starch/saccharide stabilizers, a 2 hour result with efficacy (retained enzyme) provides sufficient warewash application efficacy. According to a measurement of the invention, at least a 70% enzyme retention provides enzyme retention for warewash application efficacy under the particular conditions of use (length of time at temperature and pH conditions).

The beneficial use stability of the detergent compositions according to the invention employing the enzymes and enzyme stabilizing agents provides sufficient stability of the compositions for detergency and other benefits according to the invention. Beneficially, the stabilized use compositions according to the invention provide dramatically enhanced enzyme stability, even under circumstances of long dwell times in a sump along with use in a machine during washing cycles.

Example 6

The various enzyme stabilizing agents were further tested for soil removal using a Multi-Cycle Spot, Film and Soil Removal Test. Solid compositions were used to generate an aqueous use solution. To test the ability of compositions to clean glass and plastic, six 10 oz. Libbey heat resistant glass tumblers and two Newport plastic tumblers were used. The glass tumblers were cleaned prior to use. New plastic tumblers were used for each multicycle experiment. A food soil solution was prepared according to the methods set forth in Example 1. The glass and plastic tumblers were soiled by rolling the glasses in the 1:1 mixture of Campbell's Cream of Chicken Soup: Kemp's Whole Milk soil three times. The glasses were then placed in an oven at about 160° F. for about 8 minutes.

After filling the dishmachine with 5 grain water, the heaters were turned on. The wash water temperature was adjusted to about 155° F.-160° F. The final rinse temperature was adjusted to about 180° F.-185° F. The rinse pressure was adjusted to between about 20-25 psi. The dishmachine was primed with the use solutions of the detergent compositions, enzyme and/or potential enzyme stabilizing agents.

The soiled glass and plastic tumblers were placed in the Raburn rack (as depicted in the methods of Example 1). The dishmachine was started and an automatic cycle was run. When the cycle ended, the top of the glass and plastic tumblers were mopped with a dry towel. The glass and plastic tumblers were removed and the soup/milk soiling procedure was repeated. At the beginning of each cycle, an appropriate amount of detergent was added to the wash tank to make up for the rinse dilution. Note, when an enzyme or additive was used, only an initial dose was charged into the sump at the start of the multi-cycle test. The soiling and washing steps were repeated for a total of seven cycles.

The glass and plastic tumblers were then graded for protein accumulation using Commassie Brilliant Blue R stain followed by destaining with an aqueous acetic acid/methanol solution. The Coomassie Brilliant Blue R stain was prepared by combining 0.05 wt % dye with 40 wt % methanol, 10 wt % acetic acid, and approximately 50 wt % DI water. The destaining solution consisted of 40 wt % methanol, 10 wt % acetic acid, and 50 wt % DI water. The amount of protein remaining on the glass and plastic tumblers after destaining was rated visually on a scale of 1 to 5. A rating of 1 indicated no protein was detected after destaining. A rating of 2 indicated that 20% of surface was covered with protein after destaining. A rating of 3 indicated that 40% of surface was covered with protein after destaining. A rating of 4 indicated that 60% of surface was covered with protein after destaining. A rating of 5 indicated that at least 80% of the surface was coated with protein after destaining.

The ratings of the glass tumblers tested for soil removal were averaged to determine an average soil removal rating from glass surfaces and the ratings of the plastic tumblers tested for soil removal were averaged to determine an average soil removal rating from plastic surfaces. The results are shown in Table 10, wherein residual enzyme activity was determined based on the normalization of t=0 (i.e. 100% enzyme activity).

TABLE 10

| Stabilizer | t = 40 glass ratings | t = 40 plastic ratings | Residual Enzyme Activity |
|---|---|---|---|
| 2000 ppm potato buds | 2.0 | 1.9 | 82% |
| 1000 ppm potato buds | 3.7 | 3.0 | 87% |
| 100 ppm potato buds | 2.5 | 2.3 | 66% |
| 500 ppm gelatin | 1.1 | 1.5 | 81% |
| 100 ppm gelatin | 2.1 | 1.9 | 78% |
| 10 ppm gelatin | n/a | n/a | 48% |
| 500 ppm casein | 1.5 | 1.8 | 91% |
| 100 ppm casein | 1.9 | 1.8 | 77% |
| 10 ppm casein | n/a | n/a | 51% |
| 2000 ppm amino 1000 | 1.6 | 1.5 | 91% |
| 500 ppm amino 1000 | n/a | n/a | 78% |
| 100 ppm amino 1000 | 2.6 | 2.8 | 72% |
| None | 5.0 | 5.0 | 15% |

The multi-cycle warewash machine test results with time delay has a correlation to beaker-simulated results on residual enzyme activity in the presence of protein/starch based stabilizer. There are limitations in correlating the two methods. The warewash results show glass and plastic ratings after completing the test with time delay (about 2 hours); whereas beaker-simulated results show residual enzyme activity at 40 minutes (the start of multi-cycle testing with time delay). Beaker-simulated results show activity in a liquid/liquid interface whereas warewash machine results show enzyme activity on a solid/liquid interface (solids include insoluble soil and general ware). Even with these limitations, the same trend is observed in residual enzyme activity with and without the stabilizing agent present.

The warewash machine tests reveal the extent of soil removal from ware surfaces, in a system that is not fully solubilized on account of food soil particulates being present, and which inherently involves the solid-solution interface for the enzyme interacting with soil on ware surfaces. The results demonstrate enhanced enzyme activity retention employing the stabilized enzyme compositions according to the invention as shown by the high protein removal efficacy in warewash machine tests with residual enzyme activity greatly exceeding 30% at 40 minutes by enzyme assay.

The inventions being thus described, it will be obvious that the same may be varied in many ways. Such variations are not to be regarded as a departure from the spirit and scope of the inventions and all such modifications are intended to be included within the scope of the following claims.

What is claimed is:

1. A solid multi-use detergent composition comprising:
an alkali metal carbonate alkalinity source;
an enzyme;
a nitrogen-containing stabilizing agent that is a casein; and
water;
wherein said detergent is free of phosphorus, nitrilotriacetic add, and combinations thereof; and
wherein a detergent use solution of the composition has a pH of at least about 9 and maintains cleaning performance at temperatures of at least about 65° C. in use solution for at least about 20 minutes.

2. The composition of claim 1, wherein said detergent composition comprises between about 50 wt-% and about 85 wt-% alkali metal carbonate, between about 5 wt-% and about 30 wt-% water, between about 0.01 wt-% and about 5 wt-% enzyme, and between about 0.01 wt-% and about 30 wt-% stabilizing agent.

3. The composition of claim 1, further comprising at least one component selected from the group consisting of a surfactant or surfactant system, a chelating agent and an additional enzyme stabilizing agent.

4. A stabilized multi-use detergent use solution composition produced by the process comprising:
providing a detergent composition according to claim 1; and
contacting the detergent composition with a diluent to generate an aqueous use solution;
wherein said use solution has an alkaline pH of at least about 9; and
wherein said enzyme retains enzymatic activity in said use solution for at least 20 minutes at temperatures between about 65-80° C.

5. The composition of claim 4, wherein the stabilizing agent results in at least about 40% enzymatic activity for said period of time.

6. The composition of claim 5, wherein said use solution comprises between about 50 wt-% and about 85 wt-% alkali metal carbonate, between about 5 wt-% and about 30 wt-% water, between about 0.01 wt-% and about 5 wt-% enzyme, and between about 0.0001 wt-% and about 30 wt-% stabilizing agent.

7. The composition of claim 5, wherein said use solution has at least about 60% enzymatic activity retained for said period of time, and wherein said use solution comprises between about 10 ppm to 2000 ppm actives stabilizing agent and between about 0.1 ppm to 100 ppm enzyme.

8. The composition of claim 5, wherein said detergent use solution further contains at least one additional functional ingredient of a defoaming agent, an anti-redeposition agent, a bleaching agent, a surfactant, a solubility modifier, a dispersant, a rinse aid, a polymer, a metal protecting agent, an additional stabilizing agent, a corrosion inhibitor, a sequestrant and/or a chelating agent, a fragrance and/or a dye, a rheology modifier or a thickener, a hydrotrope or a coupler, a buffer, a solvent, and combinations thereof.

9. A method of cleaning using a stabilized multi-use detergent composition comprising:
generating a use solution with the detergent composition according to claim 1;
contacting a surface with said use solution; and
cleaning said surface with said use solution, wherein said use solution has an alkaline pH of at least about 9, and wherein said enzyme retains enzymatic activity in said use solution for at least 20 minutes at temperatures between about 65-80° C.

10. The method of claim 9, wherein at least about 60% enzymatic activity is retained for said period of time.

11. The method of claim 9, wherein at least about 50% enzymatic activity is retained for at least about 60 minutes at the pH of at least about 9 and temperatures between about 65-80° C.

12. The method of claim 9, wherein said enzyme is present in the use solution between about 0.1 ppm and about 100 ppm and wherein said stabilizing agent is present in the use solution between about 0.1 ppm and about 10,000 ppm actives.

13. The method of claim 9, wherein said enzyme is present in the use solution between about 0.1 ppm and about 100 ppm and wherein said stabilizing agent is present in the use solution between about 10 ppm and about 1,000 ppm actives.

14. The method of claim 9, wherein said surface is a ware.

15. The method of claim 9, wherein said use solution is introduced to a washing step of a wash cycle and enhances soil removal and/or prevents redeposition of soils and maintains low-foaming of a wash water source.

* * * * *